Aug. 17, 1948.	G. H. PALM	2,447,467
PUMP
Filed Oct. 23, 1943	14 Sheets-Sheet 1

Inventor:
George H. Palm
By Williams, Bradbury & Shinkle
Attorneys.

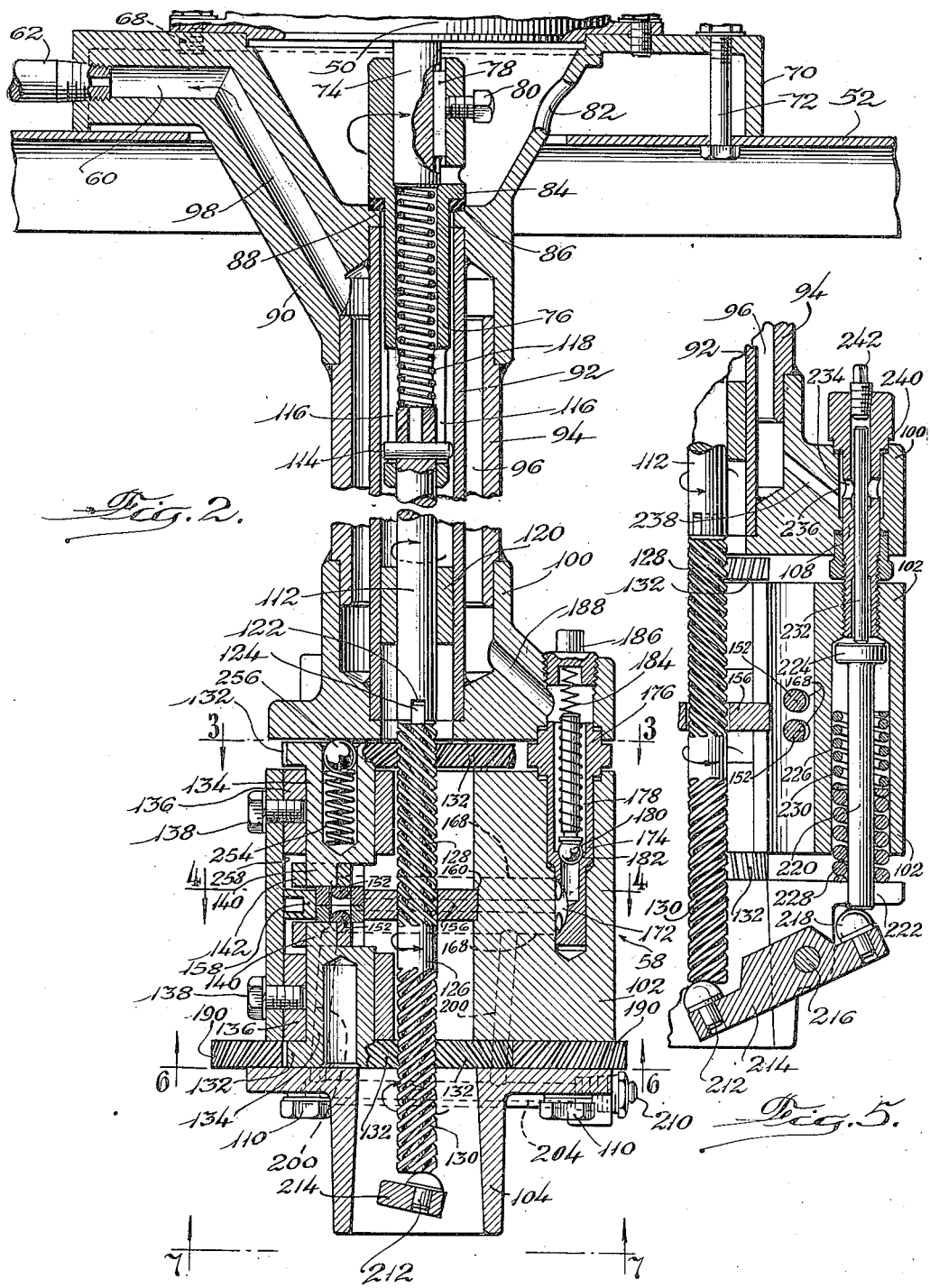

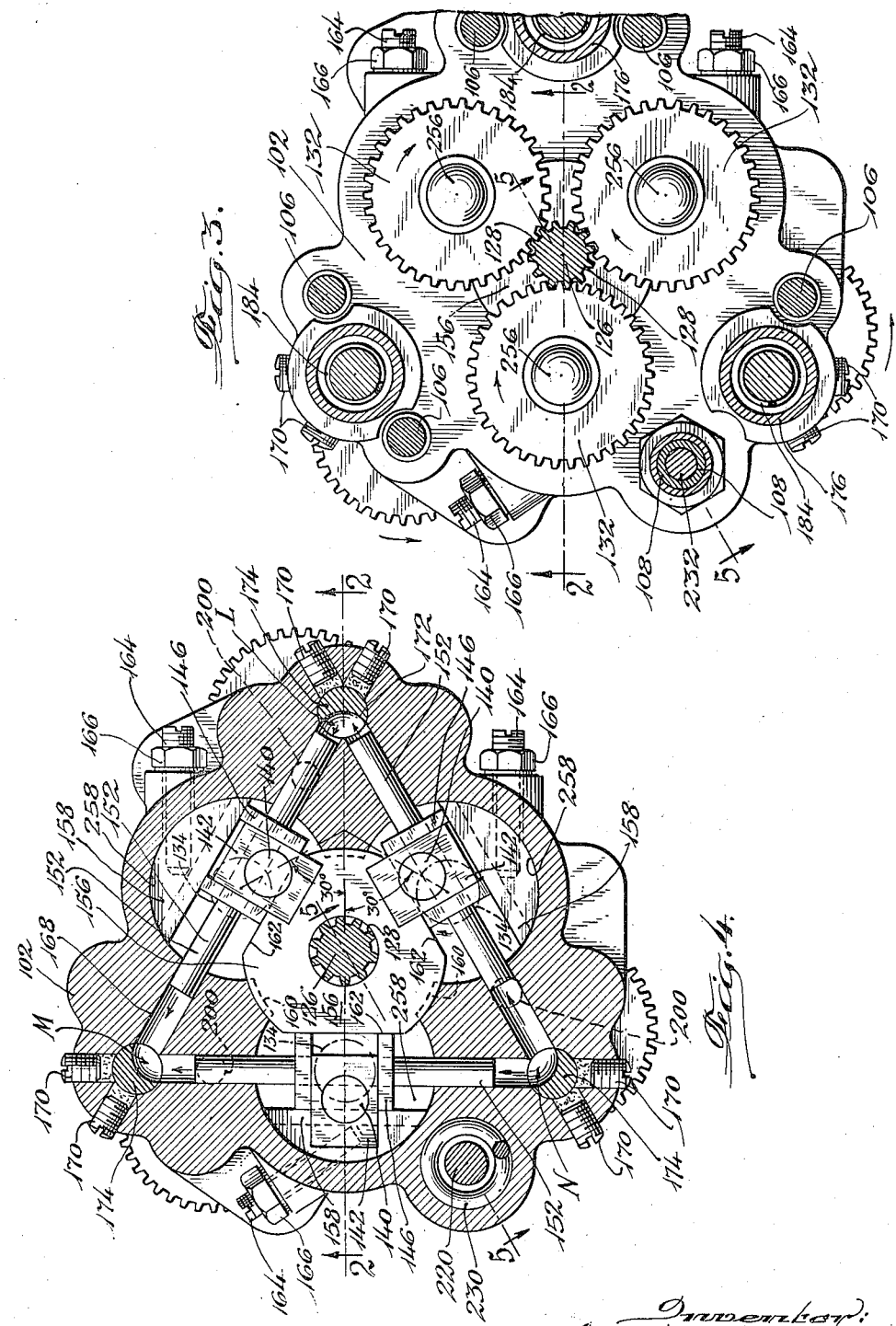

Aug. 17, 1948. G. H. PALM 2,447,467
PUMP
Filed Oct. 23, 1943 14 Sheets-Sheet 4
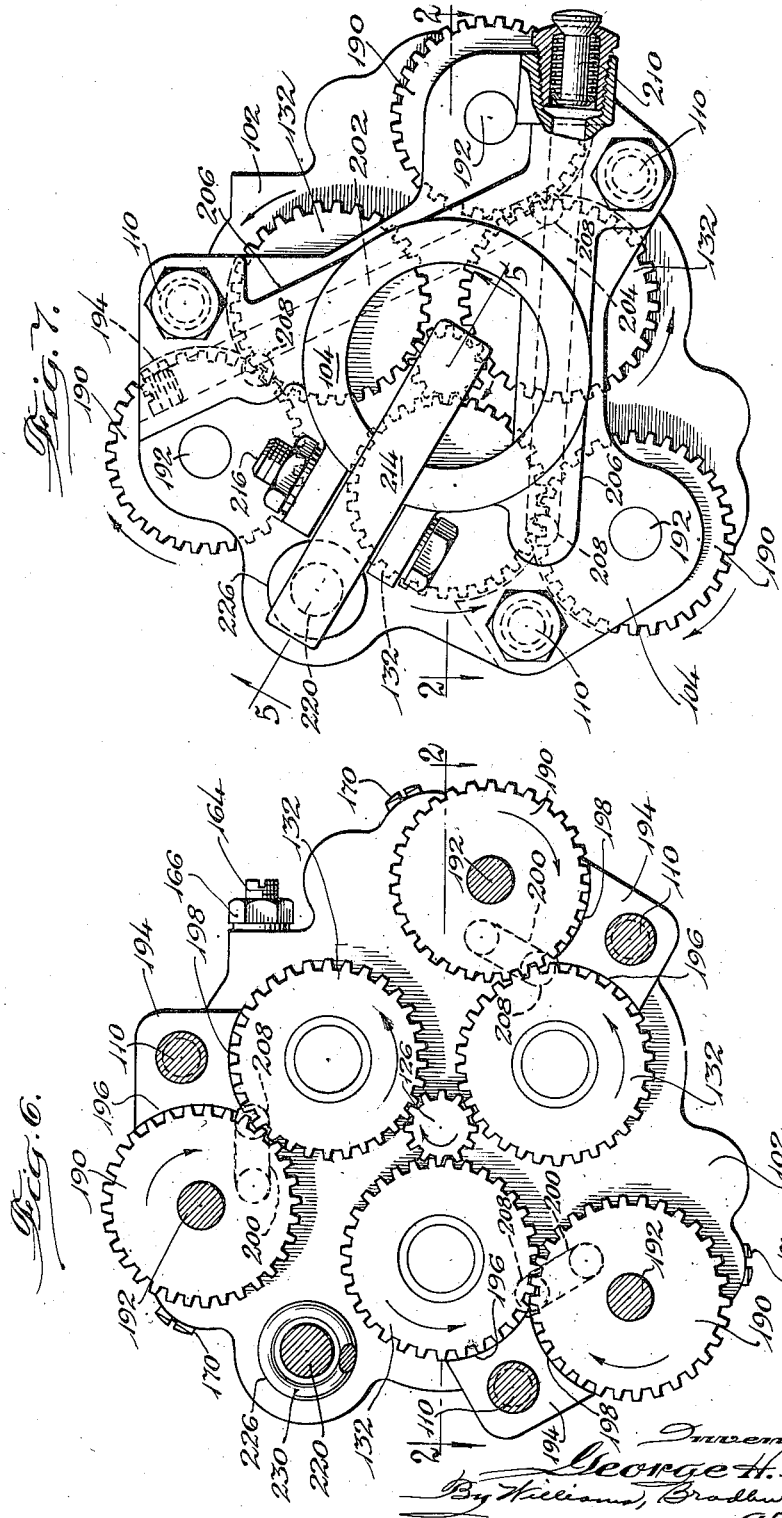

Aug. 17, 1948.   G. H. PALM   2,447,467
PUMP
Filed Oct. 23, 1943   14 Sheets-Sheet 5

Inventor:
George H. Palm
By Williams, Bradbury & Hinkle
Attorneys.

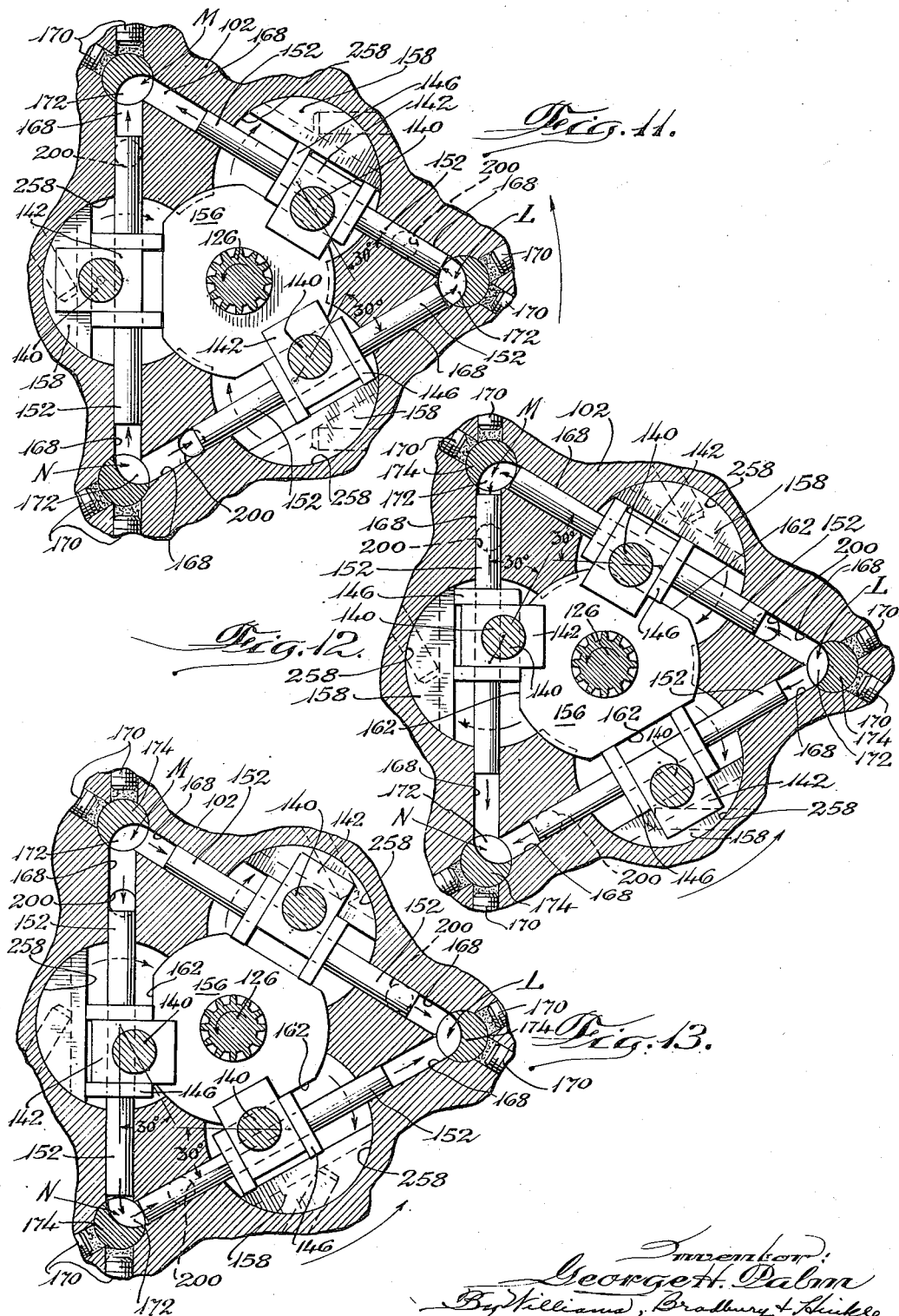

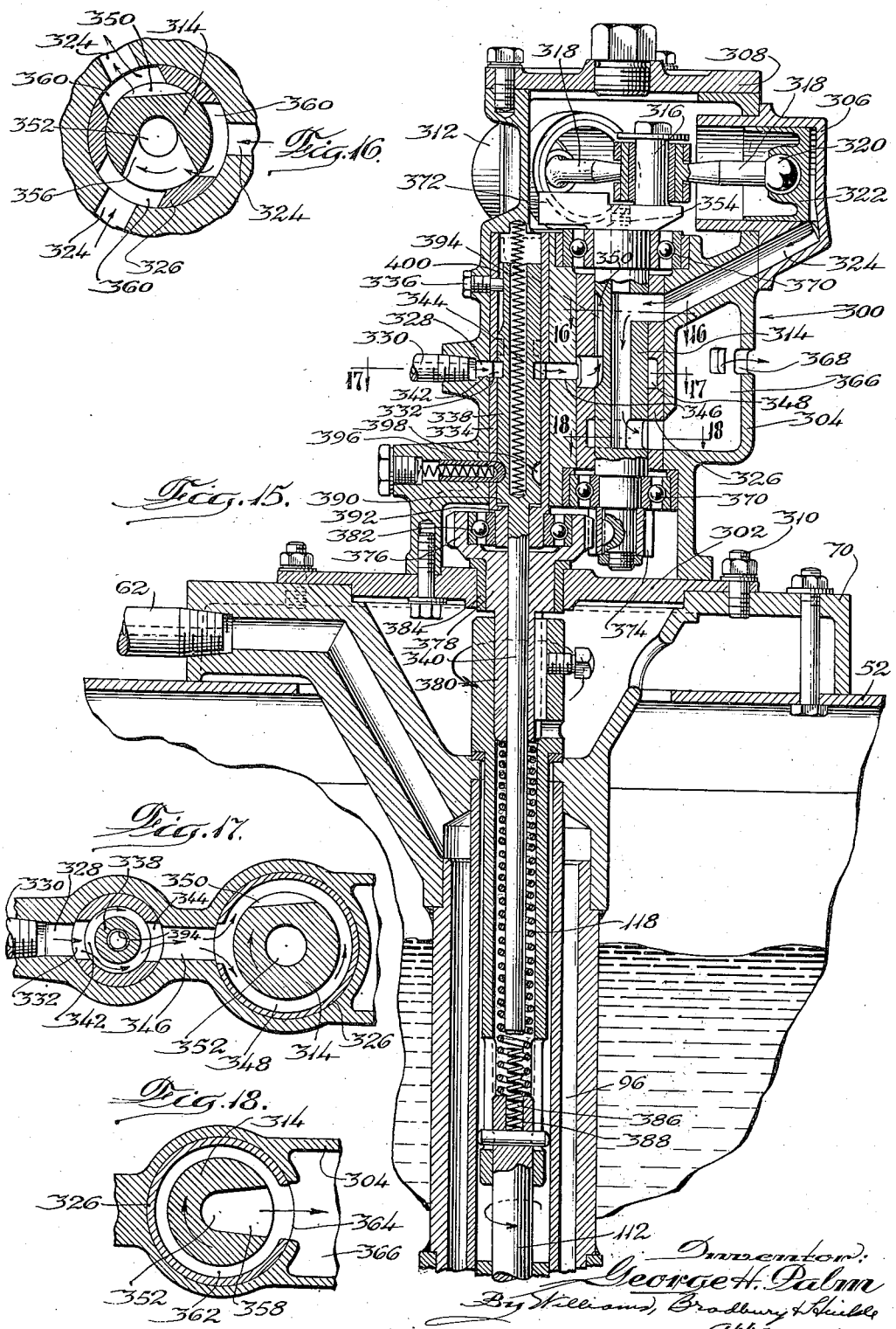

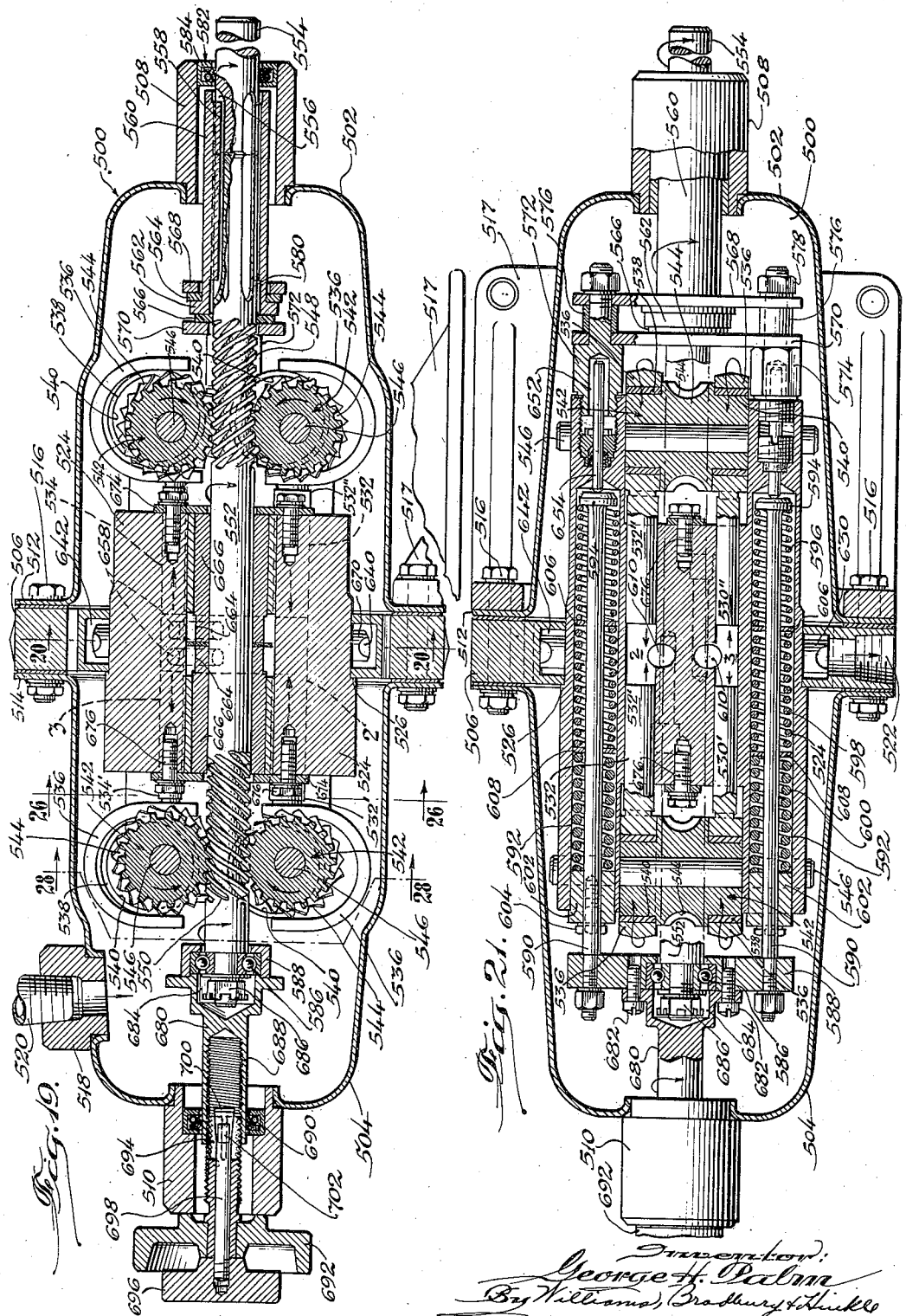

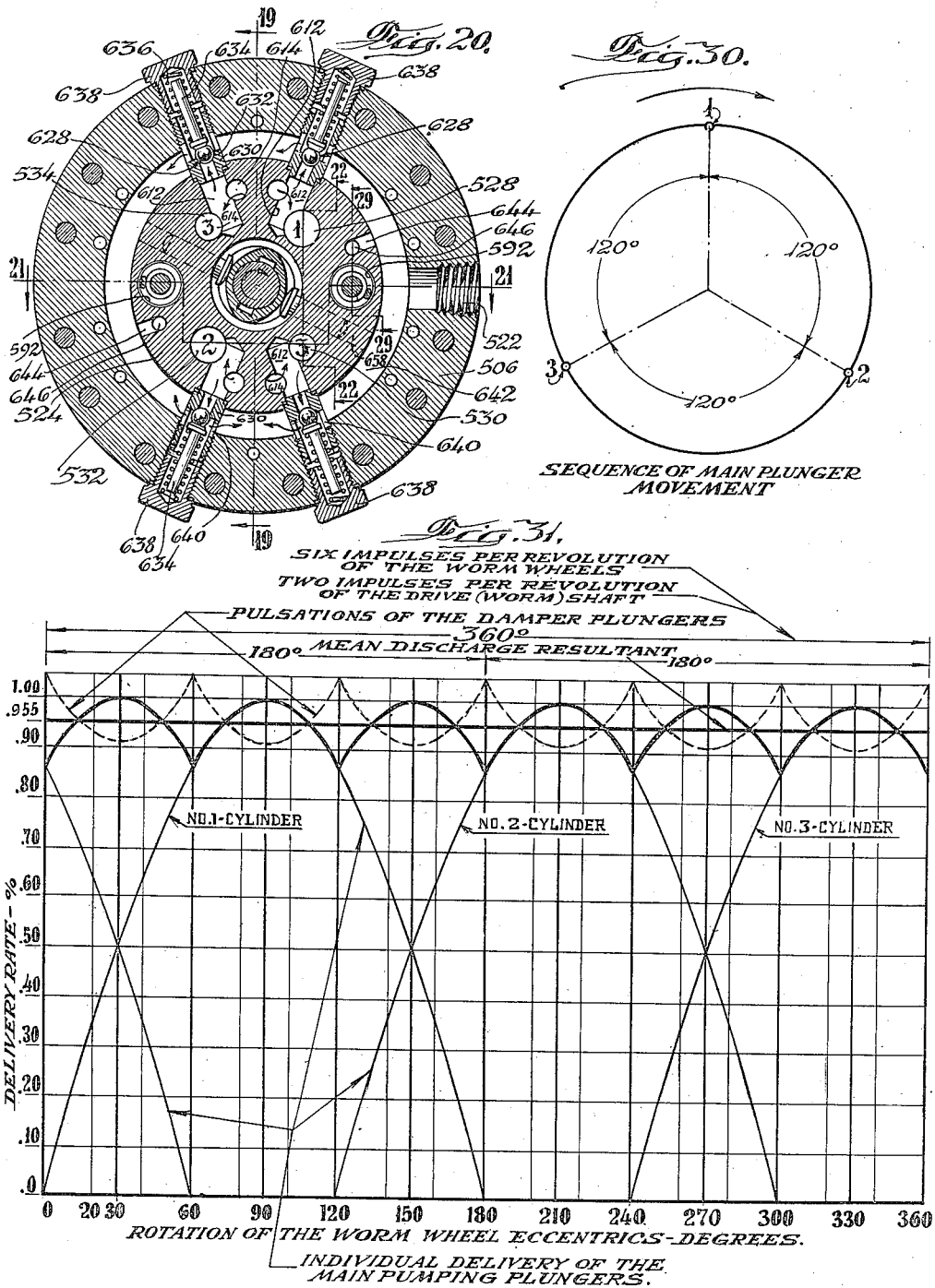

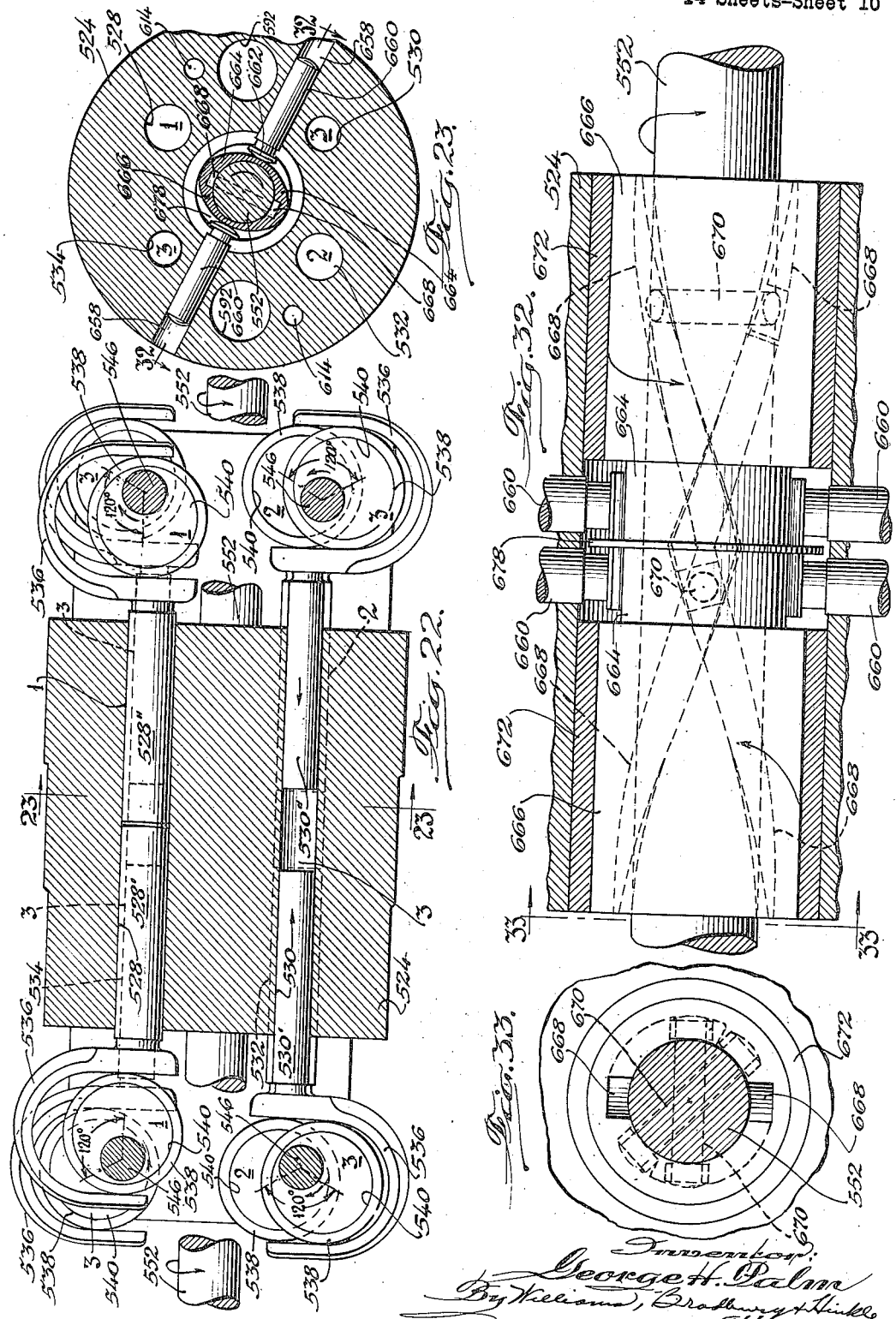

Aug. 17, 1948.                G. H. PALM                 2,447,467
                                PUMP
Filed Oct. 23, 1943                              14 Sheets-Sheet 11
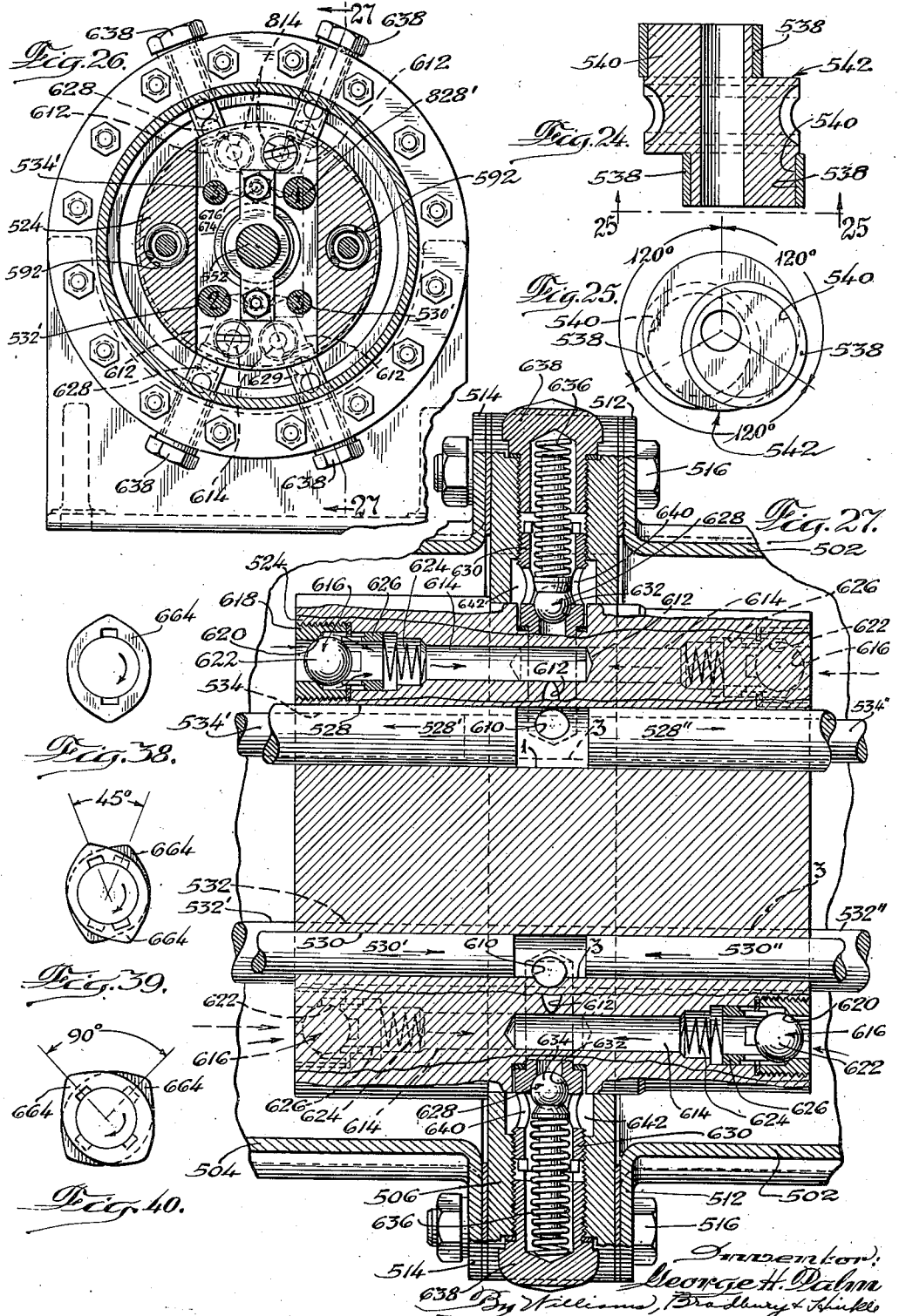

Aug. 17, 1948.　　　　　G. H. PALM　　　　　2,447,467
PUMP
Filed Oct. 23, 1943　　　　　　　　　　14 Sheets-Sheet 12

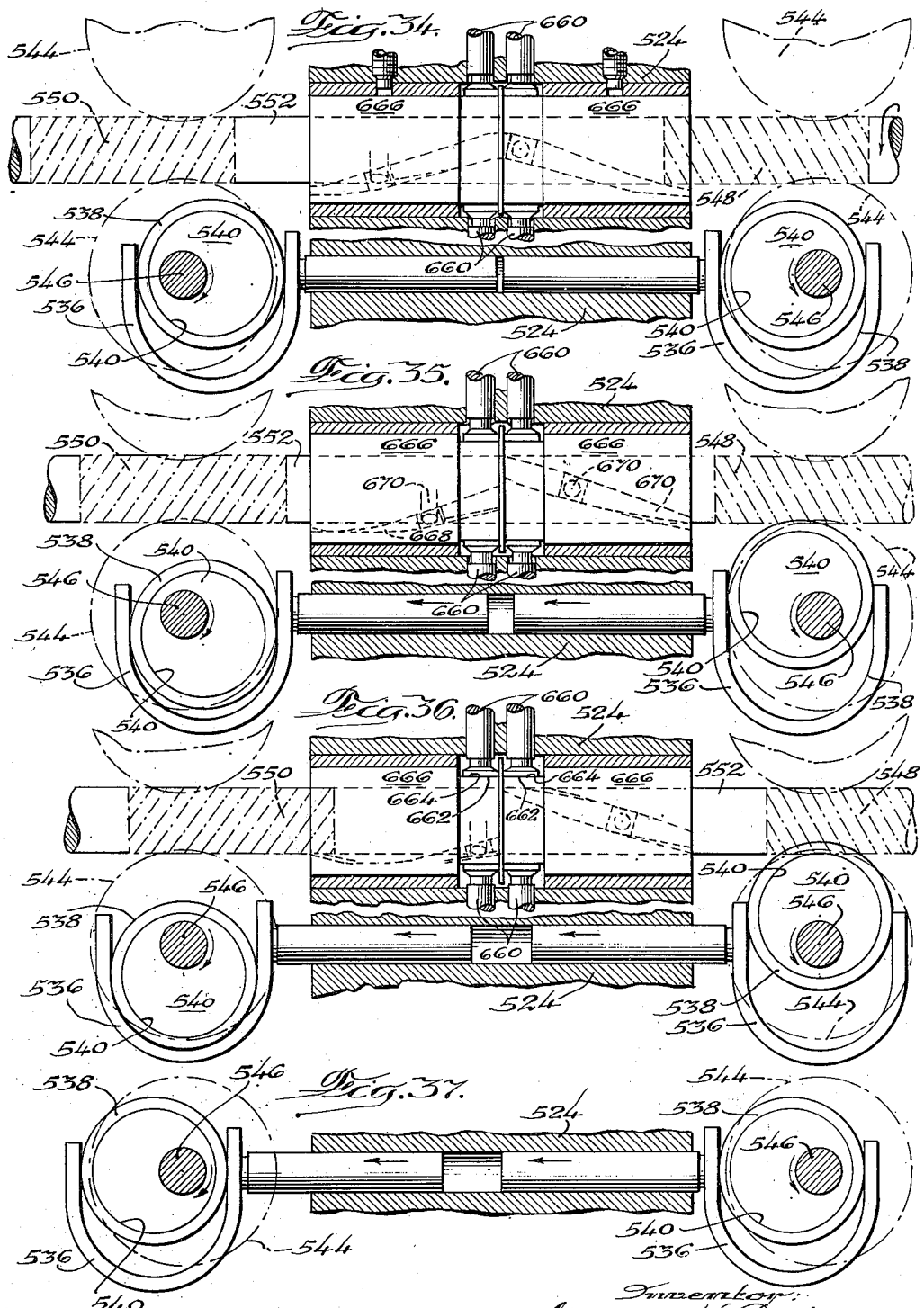

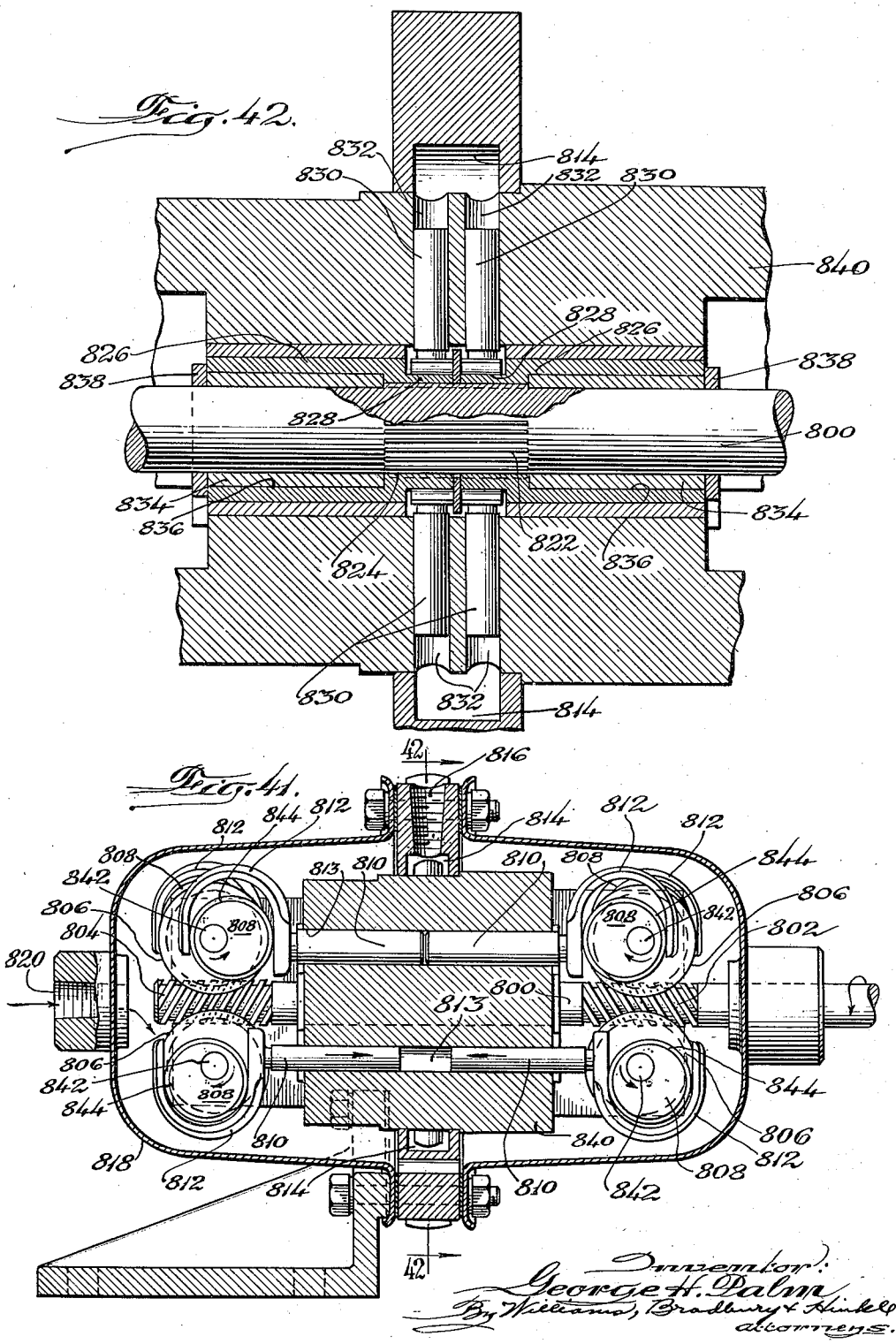

Patented Aug. 17, 1948

2,447,467

UNITED STATES PATENT OFFICE 2,447,467

PUMP

George H. Palm, Chicago, Ill., assignor to Stewart-Warner Corporation, Chicago, Ill., a corporation of Virginia Application October 23, 1943, Serial No. 507,376

16 Claims. (Cl. 103—37)

My invention relates to pumps.

An object of my invention is to provide a new and improved multi-cylinder pump which is capable of wide application.

Another object of my invention is to provide a new and improved pump which provides infinite variation in pressure and volume of discharge throughout a predetermined range of operation.

Another object of my invention is to provide a new and improved pump which affords infinite variation in volume and pressure of discharge, but which has a definite upper limit of discharge pressure.

Another object of my invention is to provide a new and improved pump wherein the pressure and volume of discharge vary inversely so that the product of the two is substantially constant throughout the range of pump operation.

Another object of my invention is to provide a new and improved pump wherein the power required to operate the pump is substantially constant for all conditions of operation so that a prime mover of minimum size may be utilized without danger of overloading the prime mover.

Another object of my invention is to provide a new and improved pump which is automatically rendered ineffective upon the creation of a predetermined pressure and which consumes little or no energy during periods of zero discharge.

Another object of my invention is to provide a new and improved pump which delivers fluid or a fluid-like substance in a uniform flow.

Another object of my invention is to provide a new and improved pump which automatically accommodates itself to different requirements and which requires no manual adjustment or control.

Another object of my invention is to provide a new and improved pump which is self priming and constitutes a unitary structure which can be applied to and removed from a conventional lubricant drum without further attention.

Another object of my invention is to provide a new and improved pump which is particularly adapted for supplying hydraulic fluid for operating machine tools or other like purposes.

Another object of my invention is to provide a new and improved pump wherein the several elements may be differently assembled to provide different operating characteristics.

Another object of my invention is to provide a new and improved pump which can be readily modified to operate throughout any given pressure range.

Another object of my invention is to provide a new and improved pump wherein many of the parts are duplicates of other parts whereby a complete pump can be assembled from a relatively few structurally different parts.

Another object of my invention is to provide a pump having new and improved structural features which improve the efficiency, durability and operating characteristics of the complete assembly.

Another object of my invention is to provide a new and improved pump which may be easily assembled.

Another object of my invention is to provide a new and improved pump of the variable delivery type which is incapable of imposing an overload on an electric motor and which accordingly can be utilized without an electric cut-out or other overload device.

Another object of my invention is to provide a new and improved air operated pump and having automatic means for cutting off the supply of air upon creation of a predetermined maximum pressure at the pump outlet.

Another object of my invention is to provide a new and improved pump of the constant delivery type.

Other objects and advantages will become apparent as the description proceeds.

In the drawings:

Fig. 2 is a vertical section through the pump shown in Fig. 1, this view being taken on the plane of the lines 2—2 of Figs. 3, 4, 6 and 7;

Fig. 3 is a transverse, sectional view taken on the line 3—3 of Fig. 2;

Fig. 4 is a transverse, sectional view taken on the line 4—4 of Fig. 2;

Fig. 5 is a partial, vertical section taken on the plane of the lines 5—5 of Figs. 3, 4 and 7;

Fig. 6 is a transverse, sectional view taken on the plane of the line 6—6 of Fig. 2;

Fig. 7 is a bottom view looking in the direction of the arrow 7 of Fig. 2;

Figs. 11, 12 and 13 are views similar to Fig. 4, but showing the relationships of the operating parts of the pumping mechanism for each 120° of rotation of the crank shafts;

Fig. 15 is a vertical, sectional view showing a modified form of my pump in which an air motor has been substituted for the electric motor shown in Fig. 1;

Fig. 16 is a partial, transverse section taken on the line 16—16 of Fig. 15;

Fig. 17 is a partial, transverse section taken on the line 17—17 of Fig. 15;

Fig. 18 is a partial, transverse section taken on the line 18—18 of Fig. 15.

Fig. 19 is a longitudinal, sectional view through a further form of my invention;

Fig. 20 is a transverse, sectional view taken on the line 20—20 of Fig. 19;

Fig. 21 is an irregular, longitudinal section taken on the line 21—21 of Fig. 20;

Fig. 22 is an irregular, partial, longitudinal section taken on the line 22—22 of Fig. 20;

Fig. 23 is a partial, transverse section taken on the line 23—23 of Fig. 22;

Fig. 24 is a sectional view through one of the gear and eccentric assemblies;

Fig. 25 is an end view of the assembly shown in Fig. 24 and is taken looking in the direction of the arrows 25 of Fig. 24;

Fig. 26 is a transverse, sectional view taken on the line 26—26 of Fig. 19;

Fig. 27 is an irregular, partial, longitudinal section taken on the line 27—27 of Fig. 26;

Fig. 30 is a diagram showing the sequential operation of the main plungers;

Fig. 31 is a diagram showing the flow characteristics of the discharge of the entire pumping mechanism;

Fig. 32 is a partial, longitudinal section taken on the line 32—32 of Fig. 23;

Fig. 33 is an end view of the mechanism shown in Fig. 32 looking in the direction of the arrows 33 of that figure;

Figs. 34, 35 and 36 show successive positions of the pumping mechanism at successive 45° intervals, the first figure representing pump operation at maximum capacity, the second figure at intermediate capacity, and the third figure at zero capacity;

Fig. 37 is a view similar to Fig. 36, but showing the crank moved through a further 90° interval;

Figs. 38, 39 and 40 show the relative positions of the two cams which operate the damper plungers in positions corresponding to the positions of the parts shown in Figs. 34, 35 and 36, respectively.

Fig. 41 is a longitudinal, sectional view through a further modification of my invention; and Fig. 42 is a transverse, sectional view taken on the line 42—42 of Fig. 41.

Figure 1:
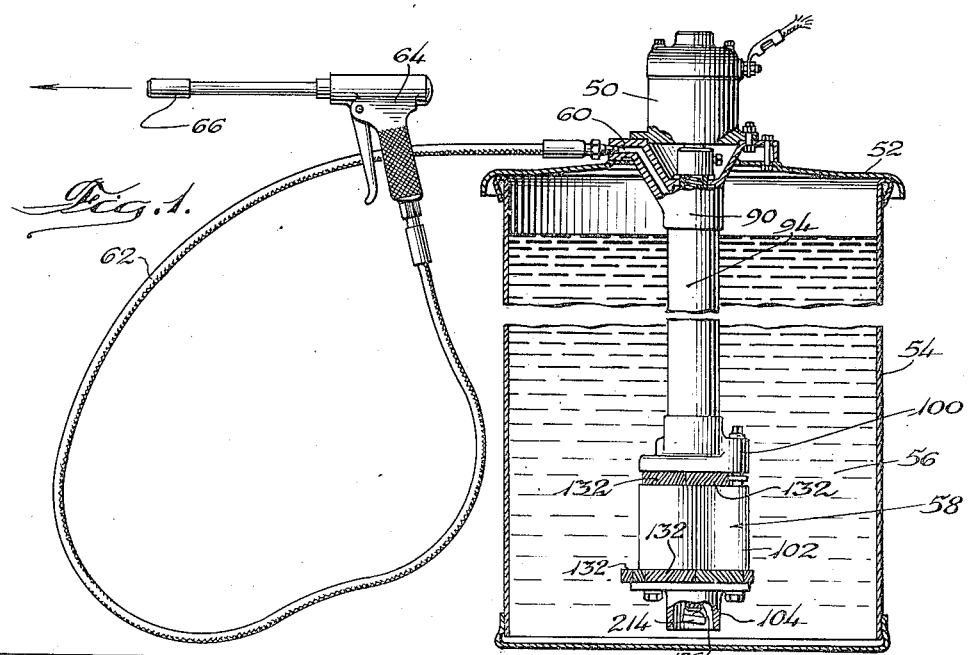
Fig. 1 is a view showing a lubricant pumping installation embodying one form of my invention.

In Figs. 1 to 14, inclusive, I have illustrated my invention as being incorporated in a lubricant compressor of the type commonly used in garages and service stations for lubricating the chassis bearings of automobiles. Referring particularly to Fig. 1, it will be seen that this lubricant compressor comprises in general an electric motor 50 mounted on a cover 52 adapted to overlie the upper end of a drum 54 containing the grease or other lubricant 56. The drum 54 may be the usual drum in which lubricant is shipped by the lubricant manufacturer or refiner.

The pumping mechanism proper is indicated at 58 and depends from the cover 52 so that this mechanism is located adjacent the bottom of the drum 54. This pumping mechanism discharges the lubricant through an outlet 60 having the usual flexible discharge hose 62 attached thereto. The opposite end of this hose is connected to a manually operated control valve 64 having a coupler 66 adapted to make a quick, detachable connection with lubricant receiving fittings permanently attached to the automobile bearings.

Referring to Fig. 2, it will be seen that the electric motor 50 is secured by bolts 68 to a base 70 secured to the cover 52 by bolts 72. The motor 50 has a motor shaft 74 which is slidably received in the upper end of a drive tube 76. The motor shaft 74 and drive tube 76 are slotted to receive a key 78 which may be clamped in place by a screw 80. The base 70 is provided with an opening 82 opposite the screw 80 whereby this screw may be tightened after the motor shaft 74 has been slipped into the upper end of the driving tube 76.

The driving tube 76 has a shoulder 84 which rests upon an anti-friction washer 86 supported by a shoulder 88 provided by the depending central portion 90 of the base 70. A pair of coaxially arranged stationary tubes 92 and 94 have their upper ends secured to the depending portion 90 of the base 70. The annular space 96 formed between these tubes constitutes a discharge passage for the lubricant discharged by the pumping mechanism 58 and the upper end of this passage connects with an inclined duct 98 leading to the lubricant outlet 60.

The pumping mechanism 58 comprises in general an upper or head casting 100, a body casting 102 and a lower casting 104 and the various operating parts associated therewith. As most clearly shown in Fig. 2, the upper or head casting 100 is attached to the lower ends of the tubes 92 and 94 so that the entire weight of the pumping mechanism 58 is carried by these tubes. The body casting 102 is attached to the head casting 100 by screws 106 (Fig. 3) and a threaded sleeve 108, and the lower casting 104 is attached to the body casting 102 by screws 110. Means which I shall hereinafter describe are provided for spacing the upper end of the body casting 102 from the lower end of the upper casting 100 and for spacing the lower casting 104 from the lower end of the body casting 102.

The lower end of the driving tube 76 is telescoped over the upper end of a driving shaft 112, as clearly shown in Fig. 2, and a pin 114 in the upper end of shaft 112 projects into slots 116 provided in the tube 76 so that shaft 112 rotates with this tube but may slide axially thereof. A spring 118 is confined between the upper end of the shaft 112 and motor shaft 74 and urges shaft 112 toward the lowermost position shown in Fig. 2. A bearing 120 for the shaft 112 is located in the stationary tube 92 and maintains this shaft in alignment with the motor shaft 74 and driving tube 76.

Figure 8:
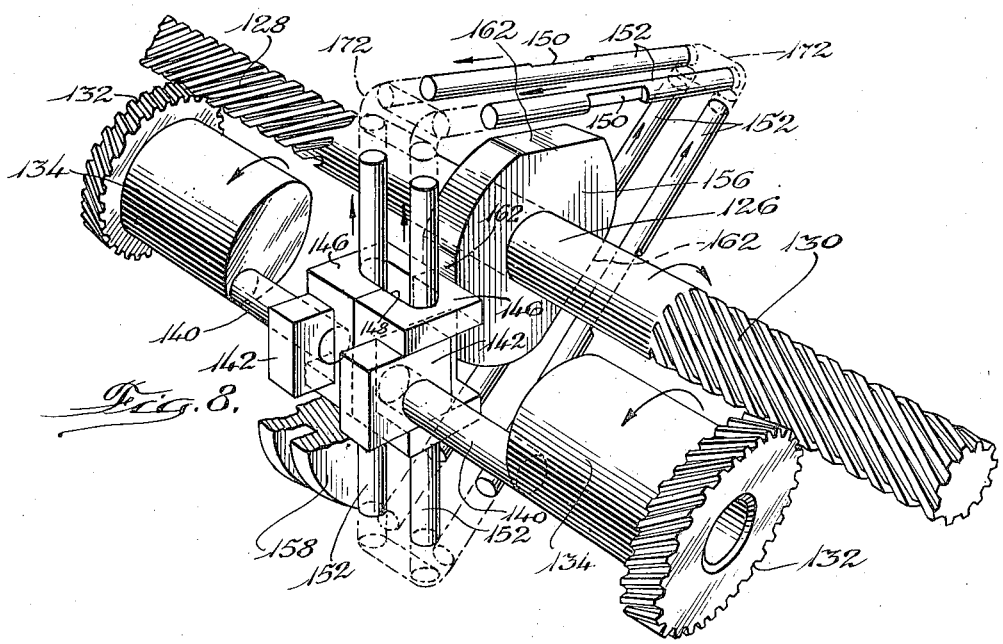
Fig. 8 is a partial phantom view showing somewhat diagrammatically the relationship between certain of the internal parts.
Figure 9:
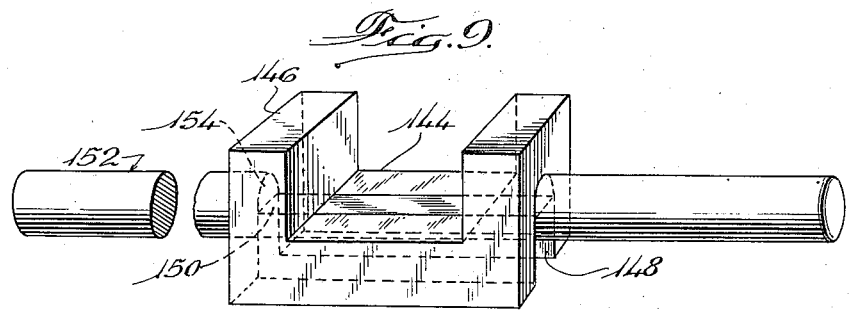
Fig. 9 is a perspective view showing the assembly of a plunger with its operating yoke.
Figure 10:
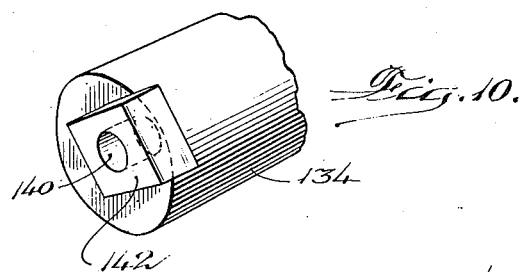
Fig. 10 is a perspective view showing part of a crank shaft having its cross head assembled thereto.

The lower end of the driving shaft 112 has a slot 122 receiving a tongue 124 of a pinion shaft 126 providing an upper pinion 128 and a lower pinion 130. The pinions 128 and 130 have oppositely inclined teeth, as clearly shown in Fig. 2. The upper pinion 128 engages and drives three identical gears 132 and the lower pinion 130 also drives three identical gears 132. Each of these gears is illustrated as being formed by the outwardly flanged end of a hollow crank 134 rotatably mounted in a bearing 136 located in the body casting 102 and secured in placed by a screw 138. The other end of each of the cranks 134 is provided with a crank pin 140 located in a bore of a cross head 142. In Fig. 8, the crank pins 140 are shown for purposes of clarification as being longer than they really are, the correct length of these pins being clearly shown in Fig. 2.

Each cross head is slidable in the channel 144 formed in a saddle 146. Each saddle has a slot 148 formed in its base and each slot receives the cut away portion 150 of a plunger 152, as clearly shown in Figs. 8 and 9. The ends of each saddle 146 engage the shoulders 154 at the ends of the reduced portion of a plunger 152, whereby the saddle 146 is rendered capable of reciprocating its plunger 152.

As clearly shown in Fig. 2, the bases of the upper group of saddles driven by upper gears 132 engage the bases of the lower group of saddles driven by the lower group of gears 132 and reciprocating movements of both groups of saddles is guided by a central guide member 156 and semi-circular guide members 158. The central guide member 156 is located in an opening extending vertically through the body casting 102 and is held in place by opposing shoulders 160 formed in this casting. The guide 156 has three flat portions 162 which are directly engaged by the saddles 146. These flat portions are of smaller diameter than the remainder of the guide member so that the guide member can be inserted in place by positioning the curved edges of the guide member opposite the three lobes of the central cavity, lowering the guide member to the center of the body casting and then rotating the guide member to the position shown in Fig. 4 with the flat portions projecting into the lobes of the body cavity and the rounded portions engaged between the opposing shoulders 160. Each of the guide members 158 forms a segment of a circle and is located in one of the lobes of the body cavity with its flat edge opposing a flat edge of the guide member 156. The guide members 158 are of channel shape in cross section and are secured in position by screws 164, whose inner ends extend into the slots formed in the back of these guide members. Lock nuts 166 are preferably provided to prevent accidental displacement of the screws 164.

Each end of each of the plungers 152 constitutes a piston and is located in one of the twelve cylinders 168 formed in the body casting 102. These cylinders are arranged in two planes, each horizontal plane containing six cylinders grouped in the form of an equilateral triangle, as clearly shown in Fig. 4. The upper triangle is exactly superimposed over the lower triangle, so that the cylinders of the upper group lie in vertical planes containing the corresponding cylinders of the lower group. Each of the equilateral triangles is formed, as most clearly shown in Fig. 4, by drilling bores completely through the body casting 102, so that the ends of the three bores in each plane intersect. After the plungers 152 have been inserted in these bores, the ends of the bores are closed by screw plugs 170.

The twelve cylinders 168 are connected together in groups of four each to form three pumping chambers, indicated by the reference characters, L, M and N. Each pumping chamber comprises a pair of upper cylinders and a pair of lower cylinders interconnected by a recess 172 formed in the lower end of a valve body 174, whose enlarged upper end 176 is clamped between the body casting 102 and the upper casting 100. Each pumping chamber, therefor, includes an upper pair of cylinders 168 forming a V with respect to each other and a lower pair of cylinders forming a similar V with respect to each other and located directly below the upper V.

Referring to Fig. 2, it will be seen that each valve body 174 includes a passageway 178 normally closed by a valve 180 urged against a valve seat 182 by a spring 184 resting against a plug 186 threaded into the upper casting 100. The lower end of each passage 178 communicates with a recess 172 forming part of a pumping chamber and the upper end of each of these passages communicates through a duct 188 with the discharge passage 96 formed between the sleeves 92 and 94.

As best shown in Fig. 6, each of the three gears 132 of the lower set meshes with a cooperating gear 190 to form a primary gear pump. Each gear 190 rotates on a pin 192 pressed into a bore in the lower casting 104. Each primary pump also has a block 194 secured in place by a bolt 110 and located between the castings 102 and 104 to determine the spacing of these castings. Each block 194 has a pair of curved surfaces 196 and 198 closely engaging the teeth of the gears 190 and 132, respectively, immediately before these teeth mesh to force the grease or other lubricant from the spaces between the gear teeth.

Each primary pump forces lubricant into the lower end of an inclined priming duct 200 leading to one of the pumping chambers. Since the pumping cylinders receive lubricant only during the intake strokes of the pistons in these cylinders, whereas the gear pumps deliver a continuous flow of lubricant, I have found it advisable to interconnect these gear pumps so that the lubricant discharged by any primary pump may flow to any of the three pumping chambers of the secondary or main pump. This interconnecting means takes the form of intersecting bores 202 and 204 formed in Y-shaped ribs 206 provided on the lower face of the casting 104. These intersecting bores are provided with three inlets 208, each inlet communicating with the gears of a primary pump and being located opposite the lower end of one of the priming ducts 200, so that the lubricant discharged by a primary pump may flow directly into a priming duct 200 or into one of the interconnecting ducts 202 or 204.

When the pumping chambers are discharged at maximum capacity, all or almost all of the lubricant discharged by the primary gear pumps is delivered to these pumping chambers, but when these pumping chambers are delivering less than their maximum output, an increased proportion of the lubricant delivered by the primary gear pumps flows back into the lubricant drum 54 through a relief check valve 210. This relief valve is preferably of the low pressure type and offers only sufficient resistance to flow of lubricant therepast to insure proper priming of the pumping chambers at all times.

The main pump delivers a maximum quantity of lubricant when all four pistons in the cylinders common to a single pumping chamber move substantially simultaneously toward the recess 172 interconnecting such cylinders, in other words when the discharge strokes of all four pistons occur simultaneously. The volume of lubricant discharged by these pumping chambers can be reduced by changing the relationship between the suction and discharge strokes of the several pistons of a common pumping chamber, so that the discharge strokes of some of these pistons overlap the intake strokes of the remaining pistons to reduce the total volumetric displacement of a pumping chamber for each complete cycle of operation.

In my novel pump, I obtain an infinitely variable range of pump discharge by changing the timing of the lower pair of pistons of each pumping chamber relative to the timing of the upper pair of pistons of such chamber to vary the discharge rate from zero to maximum. I shall now describe the manner in which this is accomplished and the means provided for accomplishing it.

The three upper plungers 152 are driven by the pinion 128 through the upper set of gears 132 so that the angular relationship of the driving cranks for the upper plungers never change with respect to each other. Similarly, the lower plungers 152 are driven by the lower set of gears 132 from the pinion 130, so that the cranks driving the lower plungers likewise never change their angular relationships with respect to each other. The angular relationships between the upper set of driving cranks and the lower set of driving cranks can be changed, however, by longitudinal shifting of the pinion shaft 126 and I have provided automatic means to accomplish such shifting and thereby vary the volumetric discharge of the pump. This means is automatically responsive to the pressure in the discharge conduit 62, so that the product of the volumetric discharge and the pressure of this discharge is substantially constant throughout the operating range of the pump.

In Figs. 11, 12 and 13, I have shown the operating sequences of the plungers lying in the same horizontal plane in different angular positions of the pump cycle. These figures show that the two pistons lying in the same horizontal plane and reciprocating in the cylinders common to a single pumping chamber do not complete their discharge and intake strokes at identically the same time, but that one of these pistons leads the other by a small amount. This slight lead of one piston over the other, however, does not materially reduce the effective capacity of these two cylinders and when each upper plunger is reciprocating simultaneously or in phase with the lower plunger therebeneath, the volumetric discharge from each pumping chamber is substantially equal to the sum of the effective volumes of the four cylinders constituting a part of such pumping chamber. As the lower plungers are shifted more and more out of phase with the upper plungers by longitudinal movement of the pinion shaft 126, the discharge strokes of the lower pistons of each pumping chamber overlap to an increasing extent the intake strokes of the upper pistons of such chamber and the volume of lubricant discharged from said chamber is correspondingly reduced.

Referring to Figs. 2 and 5, it will be seen that the lower end of the pinion shaft 126 rests upon the ball shaped head of a stud 212 mounted in one end of a walking beam 214 pivotally mounted on the pin 216 supported in the lower casting 104. The other end of this walking beam is provided with a similar stud 218 engaged by a push rod 220. The lower end of the push rod extends through a bore 222 in the lower casting 104 and the upper end of this rod is enlarged, as indicated at 224, and is slidable in a vertical bore 226 in the body casting 102. A heavy spring 228 surrounds the lower end of the rod 220 and rests upon the casting 104. A somewhat lighter spring 230 rests upon the spring 228 and has its lower end an appreciable distance below the head 224 of the rod 220.

A piston rod 232 engages the head 224 and is slidably mounted in the sleeve 108. This sleeve is provided with a cross bore 234 connecting with an annular chamber 236 surrounding an intermediate portion of the sleeve and in communication by way of duct 238 with the lubricant discharge passage 96. The upper end of the piston rod 232 is located in an enlarged bore 240 of the sleeve 108 and the upper end of this bore is closed by a screw plug 242.

From the foregoing it will be apparent that the upper end of the piston rod 232 is exposed to the lubricant pressure in the lubricant discharge passage 96 and that this pressure acts downwardly upon the piston rod 232, rod 220 and righthand end of the walking beam 214. When the parts are in the positions shown in Figs. 2 and 5, this force is resisted by the spring 118 confined between the motor shaft 74 and the driving shaft 112. This spring 118 is relatively light and the parts remain in the position shown in Figs. 2 and 5 only when there is no substantial resistance to the discharge of lubricant. As soon as any substantial resistance is encountered, rods 232 and 220 move downwardly, thereby causing walking beam 214 to move about its pivot 216 and raise pinion shaft 126 and driving shaft 112 against the resistance of spring 118.

This upward movement of the pinion shaft 126 shifts the phase relationship between the six pistons in the lower plane and the six pistons in the upper plane to reduce the output of the pumping chambers. This reduced output of the pumping chambers is accompanied by an increase in the quantity of lubricant bypassed back into the lubricant drum 54 through the primary pump relief valve 210. Further increase in resistance to discharge of lubricant will build up a higher pressure in the discharge passage 96 and result in further downward movement of rods 232 and 220 and correspondingly further upward movement of pinion shaft 126 and driving shaft 112.

When head 224 engages intermediate spring 230, the resistance of this spring is added to that of spring 118 and thereafter further movement of the rods 232 and 220, walking beam 214 and pinion shaft 126 and driving shaft 112 is resisted by both of these springs. Increased resistance to discharge of lubricant, however, creates a downward force on the piston rod 232 which overcomes the resistance of both of these springs and results in further upward movement of the pinion shaft 126 to further reduce the output of the pumping chambers. After spring 230 has been completely collapsed, further movement of the pinion shaft is resisted by spring 118 and heavy spring 228.

Figure 14:
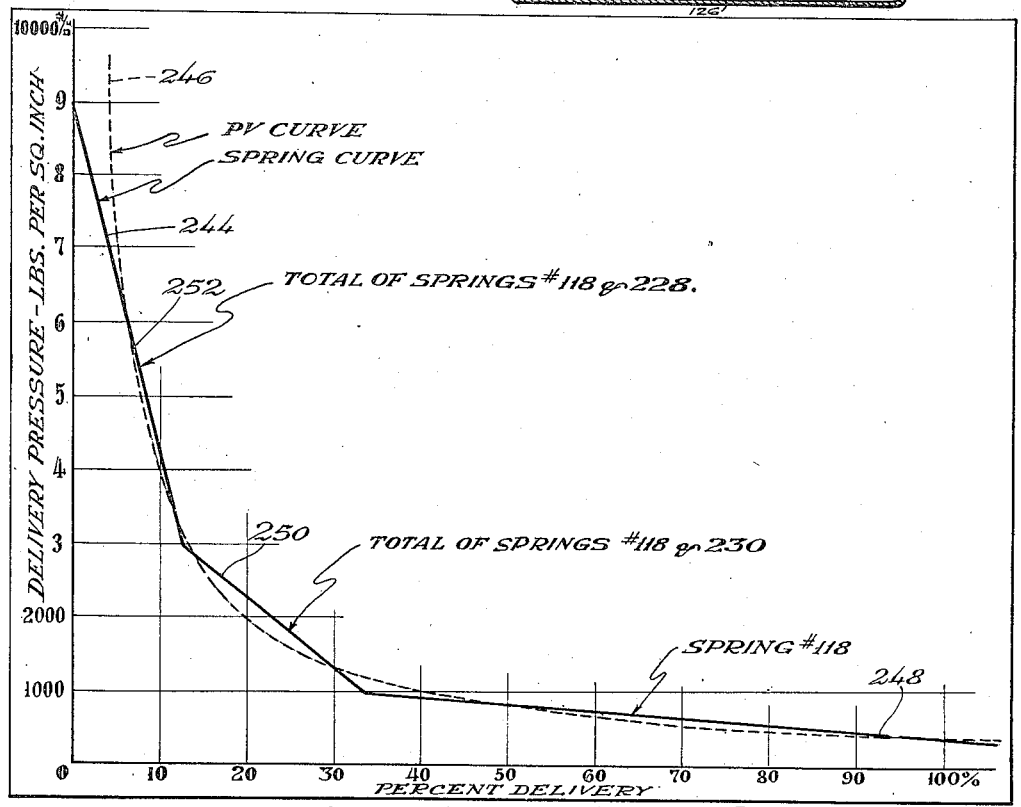
Fig. 14 is a chart showing the pressure and volume relationships of the lubricant discharge.

In Fig. 14, I have shown a chart wherein the full line curve 244 represents the relationship between pressure and volume for different positions of the pinion shaft 126. The dotted line 246 in this figure represents the relationships between pressure and volume where the product of these two is always a constant. It will be noted from this chart that the line or curve 244 representing the actual pressure volume relationship curve of the pump has a straight portion 248 showing the pressure volume relationships which exist while the spring 118 acts alone in opposing the axial movement of the pinion shaft 126. The straight section 250 of this curve represents the pressure volume relationships occurring while springs 118 and 230 are jointly resisting axial movement of the pinion shaft, and the straight section 252 of this curve represents the pressure volume relationships existing while springs 118 and 228 are resisting axial movement of this shaft.

For this chart it will be apparent that with the particular spring selected, the maximum lubricant pressure which the pump can develop is 9,000 pounds per square inch and that when this pressure is reached the discharge of the pump drops to zero. The pump can readily be designed to deliver any maximum pressure, but it is important from a practical standpoint that the discharge of the pump drops to zero when this maximum pressure is reached in order to protect the pump against breakage. With the theoretical curve 246 where the product of the pressure and volume is always a constant, an unlimited pressure can be created by a corresponding reduction in the volume of discharge and any pump following this curve would ultimately be destroyed by the unlimited pressure which would be produced when the control valve 64 is closed to prevent further discharge of lubricant.

Except for the necessity of providing a maximum pressure cut-off, it is desirable to have the actual pressure volume curve of the pump follow, as closely as possible, the theoretical curve 246 in order to permit the use of a minimum size of motor and most efficient operation. Where the product of the pressure and volume is a constant, this product determines the maximum size of motor necessary to operate the pump and since this product is never exceeded, no extra capacity need be provided for overloads. In the actual pump illustrated, the product of pressure and volume reaches a maximum at approximately 20% of delivery and this maximum product determines the maximum capacity of motor needed to operate the pump, although in actual commercial practice the motor selected must have a somewhat larger capacity to provide for friction losses and the slightly increased power necessary to force the excess priming lubricant through the bypass relief check valve 210. By using more springs or the same number of springs having special characteristics, the actual pressure volume curve can be made to approach more closely to the theoretical curve.

It is important that the upper casting 100 and the body casting 102 be properly spaced to prevent binding of the driving gears 132 therebetween. This spacing is determined by the enlarged upper ends 176 of the valve bodies 174, as clearly shown in Fig. 2. It is also important that the lower casting 104 be properly spaced from the body casting 102 to prevent binding of the lower set of driving gears 132 and of the primary pumping gears 190 meshing therewith. In fact, it is especially necessary to have exactly the proper spacing of the lower casting 104 and body casting 102 in order that the primary gear pumps operate efficiently and effectively. Such spacing is provided by the blocks 194 (Fig. 6).

Referring to Figs. 2 and 8, it will be seen that the lower side of each upper saddle 146 rests upon the upper side of the corresponding saddle located immediately therebeneath and that these saddles slide upon each other when the upper pistons are out of phase with the lower pistons. It is important to provide proper contact between the upper and lower saddles to prevent vibration and chattering and I accomplish this by resilient means which forces the upper saddles down upon the lower saddles. As best shown in Fig. 2, this resilient means takes the form of a spring 254 located in each of the three upper cranks 134 and confined between the closed lower end of the bore of its crank and a hardened steel ball 256 pressed against the lower face of the upper casting 100.

A feature of my invention which materially contributes to the quietness and freedom from vibration of my novel pump resides in the particular arrangement of the plungers 152 with respect to their operating crank pins 140. It will be noted that the central portion of each plunger is cut away to half its thickness where this plunger is straddled by a saddle 146. This cut away portion of each plunger is in direct contact with, and lies in the same plane as, the end of its operating crank pin 140, so that the end of each crank pin lies in the axial plane of the plunger which it operates. Furthermore, each crank pin is relatively short, so that twisting stresses on the hollow cranks 134 and their bearings 136 are reduced to a minimum.

The saddles 146 are firmly guided between the flat surfaces 162 of the central guide member 156 and the opposed flat surfaces of the semi-circular guide members 158. The central guide member is firmly secured in place by the opposed shoulders 160 of the body casting 102, whereas the semi-circular guide members 158 are free to adjust themselves in the bores or lobes 258. The angular arrangement of the screws 164, however, prevents tipping of the semi-circular guide members 158 about a horizontal axis and thereby insures proper positioning of these guide members with respect to the saddles 146.

In Figs. 15, 16, 17 and 18 I have shown a modified form of my invention in which the lubricant compressor is operated by an air driven motor instead of by the electric motor of the embodiment of Fig. 1. In general, the embodiment of Figs. 15 to 18, inclusive, may be identical with that of the previous embodiment, except for the change in motors and the other changes hereinafter described. Where the lubricant compressor is provided with an air motor, this motor will ordinarily be connected to the usual air pressure tank maintained in garages and service stations for filling automobile tires and similar purposes.

In this second embodiment of my invention, I have illustrated the air motor as being indicated generally by reference character 300 and as comprising a housing including a base 302, a lower casting 304, an upper casting 306, and a cover 308, all suitably attached to each other by bolts or other suitable means to form a unitary structure. The base 302 is secured by studs 310 to the base 70 of the cover 52. If desired, the bolt holes in the base 302 may be spaced similarly to the bolt holes in the motor 50 of the previous embodiment, so that air and electric motors may be interchangeably installed on the same cover and pump assembly and a feature of that form of my invention shown in Figs. 15 to 18, inclusive, lies in the provision of an air motor and control mechanism therefor which may be so substituted without requiring any change in the cover and pump assembly.

The air motor 300 is illustrated as including three cylinders 312 horizontally arranged and equally spaced about the axis of a crank shaft 314 having a single crank 316 connected to the piston rods 318 of the three cylinders. Each of these piston rods is illustrated as having a ball shaped head 320 secured to its piston 322. Each cylinder has a combined inlet and exhaust passage 324 and the crank shaft 314 and surrounding sleeve 326 cooperate to form valve means for controlling the admission and exhaust of air by way of the passages 324.

The air motor 300 has an air inlet 328 connected by a flexible hose 330, or other suitable pipe, to a source of air under pressure. This inlet communicates with a port 332 in a sleeve 334 located in a bore provided in the casting 304 and held against axial or rotative movement therein by a pin 336. Inside of the sleeve 334 is the enlarged upper end 338 of an air supply control rod 340. The upper end of this rod has an annular groove 342 which is normally in line with aligned ports 332 and 344 in the sleeve 334 and a duct 346 in the casting 104 which communicates with an annular groove 348 in the sleeve 326. The crank shaft 314 has a milled portion 350 which serves successively to connect the passages 324 of the several cylinders with the source of air supply as the crank shaft rotates.

The crank shaft 314 is provided with a longitudinal bore 352 which terminates short of the lower end of the crank shaft and is closed at its upper end by a screw plug 354. The crank shaft is also provided with an upper port 356 (Fig. 16) and a lower port 358 (Fig. 18), both communicating with the bore 352. The port 356 is in the plane of the lower ends of the passages 324 and of ports 360 formed in the sleeve 326 and aligned with the ends of these passages, as most clearly shown in Fig. 16, so that as the crank shaft rotates it successfully brings the ends of the passages 324 into communication with the bore 352 in the crank shaft. The lower crank shaft port 358 is always in communication with an annular groove 362 in the sleeve 326 (Fig. 18) which in turn communicates through a passage 364 with a muffler chamber 366 formed in the casting 304. This muffler chamber is so designed that noise entrained in the exhaust air is absorbed or neutralized therein whereby this air is discharged to atmosphere through exhaust ports 368 without creating objectionable sounds.

The crank shaft 314 is illustrated as being supported in a pair of ball bearings 370 and as having a balancing weight 372 at its upper end. The lower end of the crank shaft is provided with a pinion 374 driving a gear 376 formed on the upper end of a tubular motor shaft 378 having a projecting end 380 which may be identical in size with the corresponding part of the electric motor shaft 74 of the previous embodiment. The motor shaft 378 is guided by a ball bearing 382 at its upper end and an anti-friction bushing 384 fixed in the base 302. The spring 118 is confined between the lower end of the motor shaft 378 and the upper end of the driving shaft 112 of the pumping mechanism just as in the previous embodiment.

The lower end of the air control rod 340 is spaced some distance above the upper end of the driving shaft 112 when the latter is in its lowermost position corresponding to maximum pump discharge. A spring 386 is located in a bore 388 in the upper end of the driving shaft 112 and when this shaft is in the lowermost position, the upper end of this spring is preferably spaced from the control rod 340. In Fig. 15, the control rod 340 is shown in normal position with its shoulder 390 in engagement with a cooperating shoulder 392 provided by the sleeve 334. A spring 394 tends to hold the control rod in this position and to return it to this position when the rod is displaced therefrom. A spring pressed detent 396 is also provided to hold the control rod 340 in the lower position and for that purpose normally engages an annular groove 398 formed in the upper end of this rod.

It is most convenient to have the pipe 330 which connects the motor 300 with a compressed air tank flexible so that the cover 52 and motor and pump assembly mounted thereon can be applied to and removed from lubricant drums without disturbing the pipe assembly between the motor and air tank.

In Fig. 15, the parts are shown in the position assumed when the pump is operating at maximum discharge and under low pressure. If the pressure in the discharge passage 96 is increased either by increased bearing resistance or by closing of the control valve at the end of the lubricant discharge hose 62, this increase in pressure will cause a correspondingly great upward movement of the pinion shaft and the driving shaft 112 connected thereto. A given upward movement of the driving shaft 112 will cause the spring 386 to engage the lower end of the air control rod 340 and to urge this rod upwardly. The upward force exerted on this control rod by spring 386 is resisted by spring 394 and detent 396.

When the pressure in the discharge passage 96 reaches the maximum for which the pump is designed, the force exerted by spring 386 is sufficient to overcome the resistance of detent 396 and spring 394 and to move the control rod 340 to the upper position indicated by the dotted lines in Fig. 15. This upward movement of the control rod is guided by the pin 336 which projects into a longitudinal groove 400 and prevents rotation of this rod while permitting axial movement thereof. As soon as the upward movement of the control rod has forced detent 396 out of groove 398, the energy stored in spring 386 completes the upward movement of this rod with a snap action and equally shifts the annular groove 342 out of alignment with ports 332 and 344 and into the dotted line position indicated in Fig. 15 to cut off the supply of air to the motor cylinders.

Lubricant compressor thereupon becomes idle and ceases to operate until the pressure in the discharge passage 96 is reduced either by reduction of bearing resistance or by opening of the lubricant control valve 64. While the motor is idle, no air is consumed so that the energy consumption of the motor is maintained at a minimum, while the particular design of air motor shown is compact and light in weight and, therefore, advantageous as a source of power for driving the lubricant compressor, it will be understood that other designs of air motors could be utilized in lieu of the particular design shown in the drawings.

In Figs. 19 to 40, inclusive, I have shown a third embodiment of my invention which is particularly adapted for use as a pump to supply hydraulic fluid for operating machine tools and other devices, although equally capable of utilization as a fluid pump for general purposes. This fluid pump, like the pumps of the first two embodiments, is capable of providing infinite variation in volume of discharge and discharge pressure through the range of pump operation. This third embodiment of my invention is adapted for many different purposes and may be designed to operate over widely different pressure and volume ranges to meet the individual needs of particular uses.

This third embodiment of my invention is shown in Figs. 19 and 21 as including a housing indicated generally by reference character 500 comprising a pair of opposed sheet metal cups 502 and 504 and annular casting 506 intermediate these cups and tubular end members 508 and 510 attached respectively to the cups 502 and 504. The cups 502 and 504 are provided with radially extending flanges 512 and 514 which are attached to the annular casting 506 by bolts 516. Certain of the bolts 516 also secure the housing to a bracket 517 whereby the pump may be attached to any suitable support. The cup 504 is provided with an inlet nipple 518 suitably threaded to receive the end of a pipe 520 connected to any suitable source of hydraulic fluid or other fluid to be pumped. The casting 506 is provided with a threaded outlet 522 (Fig. 20) adapted to be connected to a suitable discharge pipe.

A generally cylindrical casting or cylinder block 524 is mounted in the annular casting 506 and has a shoulder 526 abutting one side of this annular casting. The cylinder block has four axially extending cylinder bores indicated respectively by reference characters 528, 530, 532 and 534. As most clearly shown in Fig. 20, diagonally opposed bores 528 and 532 are of the same diameter and are larger than diagonally opposed cylinder bores 530 and 534. The smaller bores are preferably of the same diameter and the cross sectional area of each of these smaller bores is preferably made one-half that of each of the larger bores. A pair of pistons is located in each cylinder bore and for convenience the lefthand piston in each bore is marked with the number of the bore and a single prime added thereto, while the righthand piston of each bore is marked with the number of the bore and two primes added thereto.

While I have shown and described the cylinder block 524 as including four cylinder bores, the pistons in the two smaller bores are operated simultaneously so that in effect these two bores constitute a single cylinder having the same capacity as each of the other two cylinders. For certain purposes, it will be more convenient in the following description to think of the pump as having three cylinders and in order to clarify this arrangement I have applied Figs. 1, 2 and 3 to the four cylinder bores to show the manner in which these cylinder bores are utilized to form what amounts to three independent cylinders.

Figure 28:
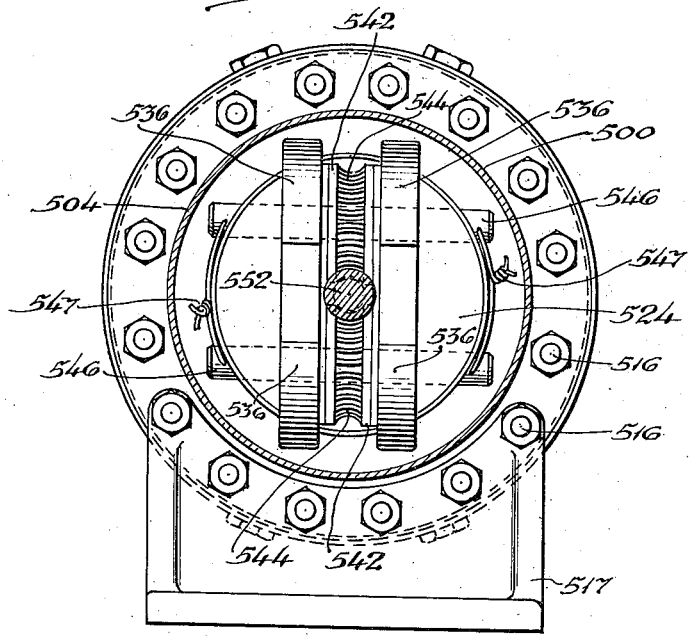
Fig. 28 is an irregular, transverse, sectional view taken on the line 28—28 of Fig. 19.

Each of the pistons in each of the cylinder bores is provided with an operating yoke 536 engaging a ring 538 freely rotatable on an eccentric 540 forming a part of a unitary casting 542 which includes a driving gear 544. The castings 542 are rotatably mounted on shafts 546 supported in the cylinder block 524 and tied together by tie wires 547 (Fig. 28).

As most clearly shown in Fig. 22, the eccentric shafts 546 are offset slightly with respect to the axis of the pistons for the purpose of reducing wear between the yokes 536, eccentrics 540 and the ring or eccentric sleeve 538. This offset arrangement of the eccentric shafts relative to the pistons also affords more room for the gears 544 and their driving mechanism whereby these parts may be made larger and sturdier.

What I have referred to as gears 544 are in fact worm wheels driven by oppositely inclined worms 548 and 550 formed on a worm shaft 552 extending through the center of the cylinder block 524. Each worm drives two worm wheels or four eccentrics and four pistons and the ratio between the worm and worm wheels is such that three rotations of the worm shaft 552 produce a complete rotation of each of the worm wheels and, therefore, a complete cycle of operation of each of the eight pistons. The two eccentrics formed integral with each worm wheel are set at an angle of 120° to each other and the four worm wheels and eight eccentrics are so positioned that the two pistons in each cylinder bore move toward and from each other in perfect synchronism to provide maximum discharge of hydraulic fluid when the worm shaft 552 is in the position shown in Figs. 19 and 21.

As previously pointed out, the four cylinder bores and the pairs of pistons operating in these bores constitute, in effect, three operating cylinders of equal displacement, the two smaller cylinder bores and their associated pistons operating together to constitute the third operating cylinder. In order to provide as nearly uniform discharge as possible from the three operating cylinders, the worm wheels and their associated eccentrics are so arranged that each of these three cylinders completes its discharge stroke for each 120° of rotation of the worm wheels 544. Since 120° movement of the worm wheels corresponds to a complete rotation of the worm shaft 552, this is equivalent to having one cylinder complete its discharge stroke for each rotation of the worm shaft.

The worm shaft 552 is driven by a driving shaft 554 which may be connected to an electric motor, an air motor, or any other type of prime mover. The lefthand end of the driving shaft 554 is provided with longitudinal grooves 556 which receive the righthand ends of the splines 558 of a coupling sleeve 560, which is rotatable with the driving shaft 554 and worm shaft 552. The coupling sleeve 560 is provided with a radially extending flange 562 located between a pair of anti-friction washers 564 and 566. The flange 562 and washers 564 and 566 are held against movement axially of the shafts 552 and 554 by a pair of bars 568 and 570 whose ends are secured to the cylinder block 524 by tubular members 572 and 574 screwed into the righthand end of the cylinder block and having reduced ends extending through openings in the bars 568 and 570. Sleeves 576 are preferably interposed between the ends of these bars and nuts 578 serve to hold these bars in place on the reduced end of the members 572 and 574.

The righthand end of the worm shaft 552 is provided with longitudinal grooves 580 slidably receiving the lefthand ends of the splines 558 of the coupling sleeve 560 whereby the worm shaft 552 may move to the left in the manner hereinafter described and still be driven by the driving shaft 554 through the coupling sleeve 560. Suitable sealing means 582 effectively prevents escape of liquid between the tubular member 508 and the driving shaft 554. In the drawing, this sealing means is shown as having a hat washer 584 positioned to prevent leakage of fluid where the pressure in the housing 500 is above atmospheric, but where my pump is utilized to draw liquid from a lower level so that the interior of the housing 500 is below atmospheric pressure, it will be understood that the hat washer 584 should be reversed or other means should be provided to prevent leakage of air into the housing 500.

The lefthand end of the worm shaft 552 is mounted in a ball bearing 586 carried by a cross head 588 attached to the end of supporting rods 590. Each supporting rod extends into a bore 592 formed in the cylinder block 524 and has an enlarged head 594. In the particular embodiment of my invention shown in the drawing, three springs 596, 598 and 600 of progressively increasing strength surround each rod 590 and are confined between the head of such rod and a sleeve 602 projecting into the appropriate bore 592. The sleeves 602 have ears which overlap the ends of the cylinder block and are secured thereto by bolts 604. Washers 606 and 608 are preferably interposed between the springs to support the adjacent ends thereof.

Referring particularly to Figs. 20, 21 and 27, it will be seen that each of the cylinder bores is provided at its center with a single port 610 through which the hydraulic fluid is both admitted and discharged. Each port 610 is formed by the intersection of a cylinder bore with one of the radial bores 612 and each of these radial bores in turn intersects the inner end of a longitudinally extending inlet bore or passage 614 which communicates with the interior of the housing 500 by way of an inlet check valve, indicated generally by reference character 616. This valve comprises a sleeve 618 screwed into the cylinder block 524 and providing a valve seat 620 adapted to be engaged by a ball valve 622. This valve is urged towards its seat by a spring 624 acting on the ball 622 through a sliding sleeve 626 having a slotted end which directly engages this ball.

The outer end of each radial bore 612 is normally closed by an outlet check valve indicated generally by reference numeral 628. This valve comprises a sleeve 630 threaded into the annular casting 506 and having its inner end extending slightly into a bore 612. Each of the sleeves 630 provides a valve seat 632 normally engaged by the rounded head of a valve member 634 urged toward its seat by a spring 636 supported by a recessed block 638 screwed into the casting 506. The sleeve 630 is cross bored to provide lateral openings 640 providing communication between the interior of the sleeve and an annular discharge chamber 642 communicating with the discharge outlet 522.

The pressure existing in the annular discharge chamber 642 will vary with the resistance encountered by the hydraulic or other fluid discharged by the pump, and I have provided means which I shall now describe whereby the discharge pressure is effective to shift the worm shaft 552 to reduce the quantity of fluid discharged by the pump as the pressure in the discharge chamber 642 increases.

Figure 29:
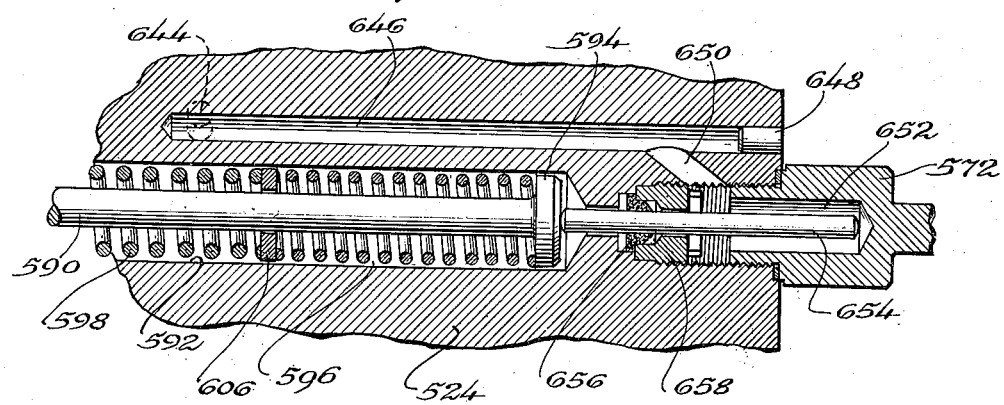
Fig. 29 is a partial, longitudinal section taken on the line 29—29 of Fig. 20.

Referring particularly to Figs. 20, 21 and 29, it will be seen that the cylinder block 524 is provided with a pair of radial bores 644 which communicate at their outer end with the annular discharge chamber 642 and which connect at their inner ends with longitudinally extending passages 646. The outer end of each longitudinal passage 646 is closed by the plug 648 and connects with a diagonal duct 650 leading to a pressure chamber 652 formed in one of the tubular members 572. A rod 654 is located in each chamber 652 and has one end exposed to the pressure therein. The other end of each of these rods engages the head 594 of one of the supporting rods 590 attached to the cross head 588. Each of the rods 654 is slidable in a packing 656 held in place by a tubular nut 658 and serving to prevent leakage of fluid from its chamber 652.

The pressure existing in the annular discharge chamber 642 is communicated to the chamber 652 and acts upon the righthand ends of the rods 654 located in these chambers. These rods, in turn, tend to urge the rods 590, cross head 588 and worm shaft 552 to the left against the resistance of the springs 596, 598 and 600. The springs 596 are weaker than the springs 598 and 600 and yield upon the creation of a predetermined pressure in the discharge chamber 642. This yield results in a leftward movement of the worm shaft 552 which changes the phase relationship between the pistons in the righthand ends of the cylinder bores and the pistons in the lefthand ends of these bores to reduce the volume of pump discharge. Increasing pressures in the discharge chamber result in increased displacement of the worm shaft 552 with further decreases in volume of pump discharge. When the predetermined maximum pressure of pump discharge is reached, the worm shaft 552 has moved sufficiently to the left so that the righthand pistons are completely out of phase with the lefthand pistons and no fluid is discharged from the three cylinders.

This pressure and volume relationship is most clearly shown in Figs. 34 through 37. Fig. 34 shows the relative position of the pistons in the opposite ends of a cylinder bore when the worm shaft 552 is in a position for maximum discharge. This position corresponds to the position shown in Figs. 19 and 21, but in Figs. 34 to 36, inclusive, this worm shaft is shown as moving to the right to reduce volumetric displacement, whereas in Figs. 19 and 21 the views are so taken that this worm shaft moves to the left to reduce the volume of discharge.

In Fig. 34, the opposing pistons reach the inner end of their discharge strokes simultaneously so that the pistons may be said to be in phase with each other and the corresponding eccentrics may also be said to be in phase with each other.

In Fig. 35, the worm shaft 552 has shifted to an intermediate position and the opposing pistons are shown as both traveling in the same direction. It will be noted that the lefthand and right end eccentrics 540 have shifted through an angle of 90° with respect to each other and in this position of the eccentrics the discharge stroke of one piston partially overlaps the intake stroke of the other, so that the volume of discharge of the pump is reduced to an intermediate value.

Fig. 36 shows the position of the parts when the pressure in the discharge chamber 642 is at a maximum and the worm shaft 552 has been shifted to afford zero delivery. In this position of the worm shaft the right and left hand eccentrics 540 have been shifted through an angle of 180° with respect to each other so that the discharge stroke of one piston exactly corresponds to the intake stroke of the opposing piston. In Fig. 36 the parts are shown in mid position of their leftward movement, whereas in Fig. 37 these pistons and their operating eccentrics are shown 90° later with the pistons at the end of their leftward stroke.

The particular position shown in Figs. 34 through 37 are selected for purposes of illustration only and do not represent all of the positions assumed by the several parts illustrated therein. A feature of my novel pump lies in its ability to afford infinite variations in pressure and volume within its range of operation and the pressure volume curve of any particular pump is determined by the particular selection of springs used to resist shifting of the worm shaft 552 in response to variations in discharge pressure. In this respect the present embodiment of my invention is similar to the embodiments previously described so that further discussion of this feature is deemed unnecessary.

Fig. 31 is a diagram showing the flow characteristics of the three pumping cylinders. The rate of discharge from each of these cylinders corresponds to a generally conical curve reaching a maximum midway of the discharge stroke of the pistons and being symmetrical with respect to this midpoint. In this chart the Number 1 cylinder is represented as starting its discharge at zero decrease of rotation of the worm wheels and their associated eccentrics and as terminating its discharge at 180° of movement of these parts. Number 1 cylinder reaches its maximum rate of discharge at 90° of movement of these parts. Number 2 cylinder starts its discharge at 120° of movement of the worm wheel eccentrics, reaches a maximum rate of discharge of 210° of movement and terminates its discharge at 300° of movement. Number 3 cylinders begin their discharge at 240° of movement, reach their maximum rate of discharge at 330° and terminate their discharge at 420° or 60° of the following cycle.

Where the discharge from one cylinder overlaps the discharge from another cylinder, the two discharges must be added together to obtain the total rate of pump discharge during such overlapping. In Fig. 31, the heavy scalloped line at the top of the figure represents the fluctuating rate of discharge from the pumping cylinders during a complete cycle of operation, that is, during a complete rotation of the worm wheels 544 and their eccentrics 548. It will be noted that the fluctuations in rate of discharge shown by this scalloped line are relatively small and this is one of the advantages gained by having the four cylinder bores operate as three pumping cylinders of equal capacity. If these four bores had been made of equal size and operated as four separate cylinders arranged to discharge at equal intervals throughout the pumping cycle, the fluctuations in the rate of discharge from these four cylinders would vary much more than does the discharge rate from the three pumping cylinders of my invention.

While the variation in the rate of total discharge from the three pumping cylinders of my novel pump does not vary over a wide range, it is desirable for many purposes to provide a uniform and invariable rate of pump discharge. In other words, it is desirable to provide a pump whose rate of discharge can be represented by a straight line such, for example, as a heavy, straight line marked "Mean discharge resultant" in Fig. 31. I shall now describe the means which I have provided to accomplish this.

Referring particularly to Figs. 19, 20 and 23, it will be seen that the cylinder block 524 is cross drilled intermediate to ends to provide four damper chambers 658. These four damper chambers lie in the same axial plane and are arranged in two groups of two each. A damper plunger 660 is located in each damper chamber and has a rounded head 662 engaged by one of the two cams 664. Each cam 664 is formed on the inner end of a sleeve 666 surrounding the worm shaft 552.

Each sleeve has a pair of curved grooves 668 (Figs. 32 and 33) which receive the square projecting ends of one of the two cross pins 670 extending diametrically through the worm shaft 552 whereby each of these cams is driven by the worm shaft through these pins. The sleeves 666 rotate in bushings 672 pressed into a central bore in the cylinder block 524 and axial displacement of the sleeves 666 is prevented by annular plates 674 attached to the opposite ends of the cylinder block 524 by screws 676. An anti-friction washer 678 is preferably located between the cams 664 formed on the inner ends of the sleeves 666.

The two cams 664 are identical with each other and each of these cams is of the double lobe type, as clearly shown in Fig. 23. The two high spots of each cam are diametrically opposite each other and, when the pump is operating at maximum discharge the high spots of one cam are in axial alignment with the high spots of the other cam. The four damper plungers 660 operate through two complete cycles for each rotation of the worm shaft 552 and since this worm shaft rotates at three times the speed of the worm gears 554 and their associated eccentrics 548, each damper plunger completes six cycles for each complete rotation of the worm wheels and eccentrics which drive the pistons in the pumping cylinders.

The damper chambers open directly into the annular discharge chamber 642 and in effect constitute an extension thereof. The sole function of the damper plungers is to vary the volume of this discharge chamber in such manner as to offset the variation in rate of discharge of the pumping cylinders so that fluid is delivered through the discharge outlet 522 at a uniform rate for any given axial position of the worm shaft 552. This relationship is diagrammatically shown in the chart of Fig. 31 wherein the pulsations of the damper plungers or volumetric displacement of the damper chambers is indicated by the scalloped, dotted line at the top of the chart. The cams 664 are so shaped that this dotted line is identical with, but opposite to, the scalloped, heavy line representing the combined discharge of the pumping cylinders. The algebraic addition of the two scalloped lines reduces the heavy uniform flow line bearing the number .995 and marked "Mean discharge resultant."

When the worm shaft 552 is moved longitudinally to reduce the output of the main pumping cylinders, this same movement of the worm shaft correspondingly reduces the overall volumetric displacement of the damper chambers. As I have previously stated, when the pump is operating at maximum discharge, the high points of the two damper cams 664 are in alignment so that a view of these two cams from one side could be represented by a side view of a single cam such as is shown in Fig. 38. This Fig. 38 indicates the relative annular position of the two cams 664 when the worm shaft 552 is in the maximum discharge position shown in Fig. 34.

When the worm shaft shifts to an intermediate position, as shown in Fig. 35, the pins carried by the worm shaft move lengthwise of the inclined grooves 668 to produce relative annular movement between the two sleeves 672 and their damper cams 664. This movement of the worm shaft causes the high points of one cam to be positioned at an angle of 45° to the high points of the other cam, as shown in Fig. 39. This causes the two righthand damper plungers 660 to be partially out of phase with the two lefthand damper plungers and thereby reduces the volumetric change in the size of the discharge chamber caused by operation of these damper plungers.

This reduction in the volumetric change caused by the damper mechanism corresponds to the reduction in discharge from the main pumping cylinders, so that the flow of fluid through the discharge outlet 522 remains uniform but at a reduced rate. When the worm shaft 552 is shifted to the zero position shown in Figs. 36 and 37, the damper cams assume the 90° relationship shown in Fig. 40 and operation of the damper plungers creates no change in the volumetric capacity of the discharge chamber.

Under some conditions it may be desirable to provide manual means for shifting the worm shaft to limit the initial volumetric discharge of the pump. In Figs. 19 and 20 this means is shown as comprising a tension member 680 secured to the cross head 588 by screws 682. The tension member 680 is provided with a recess 684 which contains the nut 686 threaded on the lefthand end of the worm shaft 552 and causing this worm shaft to be pulled to the left by leftward movement of the cross head 588. This tension member 680 has a tubular internally threaded extension 688 which is slidably received in a sealing means 690 located in the tubular end member 510. A hand wheel 692 has threaded resilient fingers 694 lying in the tubular extension 688, but normally retarded so that the threads of these fingers do not engage the threads of this extension. The extension 688 is, therefore, normally free to slide axially of the fingers 694 without engaging these fingers.

When it is desired to move the worm shaft 552 manually, a clutch wheel 696 is rotated to draw a clutch pin 698 to the left and cause the tapered head 700 of this pin to urge the fingers 694 into engagement with the threaded interior of the extension 688. The clutch pin 698 is held against rotation relative to the fingers 694 by ears 702 extending into slots between these fingers. After the fingers have been brought into engagement with the threaded interior of the extension 688, the hand wheel 692 may be rotated to draw the worm shaft 552 to the left to any desired extent.

This manual shifting of the worm shaft 552 affects only the maximum output of the pump by reducing this output to a value corresponding to the leftward movement of the worm shaft. This position of the worm shaft corresponds to a given pressure in the discharge chamber and no further shifting of the worm shaft will occur until this predetermined pressure is exceeded. Any increase in discharge pressure over this predetermined pressure will result in further leftward movement of the worm shaft and will cause hand wheel 692 to move away from the lefthand end of the tubular member 510. When the discharge pressure is again reduced, the worm shaft can return to the right only as far as permitted by engagement of hand wheel 692 with end member 510. The manual presetting of the pump can be released by rotating clutch wheel 696 and thereby permitting fingers 694 to dis-engage the internal threads of the tension member 680 whereupon springs 596, 598 and 600 will cause the worm shaft to assume a position corresponding to the pressure in the discharge chamber.

In Figs. 41 and 42, I have shown a fourth embodiment of my invention which is generally similar to the third embodiment but differs therefrom by providing a pump with a non-variable delivery. In this pump of Figs. 41 and 42, the worm shaft 800 is held against axial movement. This shaft has oppositely inclined worms 802 and 804, each driving two worm wheels 806. Each of the worm wheels 806 drives a pair of integral eccentrics 808 which reciprocate the pistons 810 through yokes 812. The pistons are located in the ends of four cylinder bores 813 grouped as in the previous embodiment. Two of these cylinder bores are of large diameter and two of small diameter and the four cylinder bores and their associated pistons and the driving connections therefor are arranged so that the two smaller cylinder bores discharge simultaneously and function as a single pumping chamber.

The cylinder bores discharge into a common annular discharge chamber 814 communicating with a pump outlet 816. The casing 818 which encloses the pumping mechanism is provided with an inlet 820, illustrated as being located in one end of the casing or housing instead of at the side, as in the previous embodiment.

The pump shown in Figs. 41 and 42 is of the constant volume discharge type and is provided with damper plungers which cause fluid discharged by the pump to flow therefrom at a uniform rate. From Fig. 42 it will be apparent that the worm shaft 800 is provided with longitudinally extending ribs 822 at its center and that these ribs are inter-engaged with the inwardly projecting ribs 824 formed on the ends of a pair of cam sleeves 826, whereby these sleeves rotate with the shaft 800. Each of these sleeves has a double lobed cam 828 adapted to engage the inner ends of the damper plungers 830 which are reciprocable in radially extending damper chambers 832 in open communication with the discharge chamber 814. Tubular bushings 834 are preferably interposed between the shaft 800 and the enlarged bores 836 of the sleeves 826 and end plates 838, bolted or otherwise attached to the cylinder block 840, serve to hold the bushings 834 and sleeves 826 against axial movement.

Except for the fact that the embodiment of Figs. 41 and 42 does not provide a variable delivery and has no pressure responsive mechanism for varying delivery, this embodiment of my invention is similar to the embodiment of Figs. 19 to 40, inclusive. In both of these embodiments of my invention, the operating characteristics of the pump can be changed by changing the angular relationships between the operating eccentrics for the several pistons and a similar variation of the operating characteristics of the first two embodiments of my invention can be effected by changing the angular relationship between the cranks for the plungers in the cylinders forming parts of the three pumping chambers.

In the embodiment of Figs. 41 and 42, I have provided means for changing the operation of the damper plungers to conform to changes in operation of the pistons 810 resulting from a change in the relationship between the operating eccentrics 808 for the several pistons. As best shown in Fig. 42, the end plates 838 can be removed to permit removal of the sleeves 826 and tubular bushings 834. The two cam sleeves can then be rotated relative to each other an amount corresponding to the shift in relationship between the piston operating eccentrics. The cam sleeves 826, bushings 834 and end plates 838 are then re-assembled. By such a re-arrangement of the piston driving eccentrics and the cams for the damper plungers, the pump can readily be adjusted to reduce its volume of discharge and thereby adapt it for use with higher pressures without necessitating an increase in the power of the prime mover which drives the pump. Where an automatically variable discharge is not required, the pump of Figs. 41 and 42 is cheaper, lighter, simpler and more compact than the pump of the previous embodiment.

While the various parts of my pump may be made of any suitable material, I have found it particularly desirable to make the worm shaft 802 of steel or similar hard metal, the worm wheels 806, and their integral eccentrics 808 of bronze, and the pins or jack shafts 842 of steel. The eccentric sleeves 844 and yoke 812 are both of hard material, such as steel, but since there is little relative movement between these parts, no substantial frictional losses occur at this point. On the other hand, the frictional losses between the worm wheels and the worms and between the jack shafts 842 and worm wheels and integral eccentrics are kept to a minimum by the differences in the materials of the relatively moving parts.

While I have illustrated and described two forms of my invention as being particularly adapted for use in pumping grease and similar lubricants and the other two forms of my invention as being particularly adapted for pumping hydraulic fluid for operating machine tools, all forms of my invention are capable of wide application and are not to be understood as limited to these particular uses. It is also to be understood that my invention is not limited to the particular details shown and described, but may assume numerous other forms and that my invention includes all variations, modifications and equivalents coming within the following claims.

I claim:

1. A pump of the class described, comprising a body having an opening extending through the center thereof, a group of three cylinder bores arranged in a plane perpendicular to said opening and forming an equilateral triangle, a second group of three cylinder bores arranged in an equilateral triangle and located in a plane parallel to said first named plane, means providing communication between the apices of the two triangles, pistons located in said cylinder bores, a shaft extending through said opening, a first gear having inclined teeth provided by said shaft, three driving gears driven by said inclined teeth, cranks driven by said driving gears, connections between said cranks and the pistons in the cylinder bores of one plane, a second gear having oppositely inclined teeth provided by said shaft, a second set of driving gears driven by said last-named inclined teeth, a second set of cranks driven by said last-named driving gears, means connecting said last-named cranks with the last-mentioned pistons, a common discharge outlet for all of said cylinder bores, means responsive to pressure variations in said outlet for shifting said shaft and its two gears with oppositely inclined teeth relative to said two sets of driving gears, and a plurality of springs of different strengths for opposing shifting movement of said shaft.

2. A pump of the class described, comprising a body having an opening extending through the center thereof, a group of three cylinder bores arranged in a plane perpendicular to said opening and forming an equilateral triangle, a second group of three cylinder bores arranged in an equilateral triangle and located in a plane parallel to said first named plane, means providing communication between the apices of the two triangles, pistons located in said cylinder bores, a shaft extending through said opening, a first gear having inclined teeth provided by said shaft, three driving gears driven by said inclined teeth, cranks driven by said driving gears, connections between said cranks and the pistons in the cylinder bores of one plane, a second gear having oppositely inclined teeth provided by said shaft, a second set of driving gears driven by said last-named inclined teeth, a second set of cranks driven by said last-named driving gears, means connecting said last-named cranks with the pistons parallel with the last-mentioned pistons, common discharge outlet for all of said cylinder bores, and means responsive to pressure variations in said outlet for shifting said shaft and its two gears with oppositely inclined teeth relative to said two sets of driving gears.

3. A pump of the class described, comprising a body having an opening extending through the center thereof, a group of three cylinder bores arranged in a plane perpendicular to said opening and forming an equilateral triangle, a second group of three cylinder bores arranged in an equilateral triangle and located in a plane parallel to said first named plane, means providing communication between the apices of the two triangles, pistons located in said cylinder bores, a shaft extending through said opening, a first gear having inclined teeth provided by said shaft, three driving gears driven by said inclined teeth, cranks driven by said driving gears, connections between said cranks and the pistons in the cylinder bores of one plane, a second gear having oppositely inclined teeth provided by said shaft, a second set of driving gears driven by said last-named inclined teeth, a second set of cranks driven by said last-named driving gears, means connecting said last named cranks with the pistons parallel with the last-mentioned pistons, common discharge outlet for all of said cylinder bores, means responsive to pressure variations in said outlet for shifting said shaft and its two gears with oppositely inclined teeth relative to said two sets of driving gears, and resilient means opposing shifting movement of said shaft.

4. A pump of the class described, comprising a body having an opening extending through the center thereof, a group of cylinder bores arranged in a plane perpendicular to said opening, a second group of cylinder bores located in a plane parallel to said first named plane, means providing communication between certain cylinders of the two groups, pistons located in said cylinder bores, a shaft extending through said opening, a first gear having inclined teeth provided by said shaft, driving gears operated by said inclined teeth, cranks driven by said driving gears, connections between said cranks and the pistons in the cylinder bores of one plane, a second gear having oppositely inclined teeth provided by said shaft, a second set of driving gears driven by said last-named inclined teeth, a second set of cranks driven by said last-named driving gears, means connecting said last-named cranks with the pistons parallel with the last-mentioned pistons, common discharge outlet for all of said cylinder bores, means responsive to pressure variations in said outlet for shifting said shaft and its two gears with oppositely inclined teeth relative to said two sets of driving gears, and spring means for opposing shifting movement of said shaft.

5. A pump of the class described, comprising a body having an opening extending through the center thereof, a group of cylinder bores arranged in a plane perpendicular to said opening, a second group of cylinder bores located in a plane parallel to said first named plane, means providing communication between certain cylinders of the two groups, pistons located in said cylinder bores, a shaft extending through said opening, a first gear having inclined teeth provided by said shaft, driving gears operated by said inclined teeth, cranks driven by said driving gears, connections between said cranks and the pistons in the cylinder bores of one plane, a second gear having oppositely inclined teeth provided by said shaft, a second set of driving gears driven by said last-named inclined teeth, a second set of cranks driven by said last-named driving gears, means connecting said last-named cranks with the pistons in the other plane, and means for shifting said gears with oppositely inclined teeth relative to said two sets of driving gears, and a common discharge outlet for all of said cylinder bores.

6. A pump of the class described, comprising a body having an opening extending through the center thereof, a group of cylinder bores arranged in a plane perpendicular to said opening, a second group of cylinder bores located in a plane parallel to said first named plane, means providing communication between certain cylinders of the two groups, pistons located in said cylinder bores, a shaft extending through said opening, a first gear having inclined teeth provided by said shaft, means connecting said teeth and the pistons in the cylinder bores of one plane, a second gear having oppositely inclined teeth provided by said shaft, means connecting said last-named teeth with the other pistons, and means for shifting said shaft and its two gears with oppositely inclined teeth relative to said connecting means.

7. A pump of the class described, comprising a pumping chamber including intersecting cylinder bores arranged to form V's in parallel planes, said cylinder bores being interconnected at the apices of said V's, pistons in said bores, a pair of gears having oppositely inclined teeth for driving said pistons, driving connections between said teeth and pistons, means for shifting simultaneously said gears relative to said driving connections to change the phase relationship between certain of said pistons to vary the discharge from said pumping chamber, and yielding means for resisting shifting of said gears.

8. A pump of the class described, comprising a pumping chamber, a first piston for varying the size of said chamber, a second piston for varying the size of said chamber, a pair of members having oppositely inclined teeth for driving said two pistons, driving connections between said teeth and pistons, means for shifting said members relative to said driving connections to change the phase relationship between said first and second pistons to vary the discharge from said pumping chamber, said driving connections including cranks having ends lying in planes passing through the axes of said pistons, and means resisting shifting of said members.

9. A pump of the class described comprising a cylinder block having a central opening therethrough, four cylinder bores located in said block and parallel to said opening, two of said bores being of one size and the other two of said bores each being of half the cross section of one of the first-named bores, a piston in each end of each cylinder bore, a driving shaft extending through said opening, a pair of transverse shafts at each end of said cylinder block and offset with respect to said cylinder bores, a worm wheel mounted on each of said transverse shafts, a pair of eccentrics driven by each worm wheel and arranged at an angle of 120° with respect to each other, a yoke associated with each eccentric and connected to one of said pistons, and a sleeve between each eccentric and its associated yoke, said eccentrics being arranged so that the two smaller cylinder bores discharge simultaneously to constitute in effect a single pumping chamber.

10. A pump of the class described comprising a cylinder block having a central opening therethrough, four cylinder bores located in said block and parallel to said opening, two of said bores being of one size and the other two of said bores each being of half the cross section of one of the first-named bores, a piston in each end of each cylinder bore, a driving shaft extending through said opening, a pair of transverse shafts at each end of said cylinder block, a worm wheel mounted on each of said transverse shafts, a pair of eccentrics driven by each worm wheel, a yoke associated with each eccentric and connected to one of said pistons, said eccentrics being arranged so that the two smaller cylinder bores discharge simultaneously to constitute in effect a single pumping chamber, a common discharge chamber communicating with all of the cylinder bores, radially extending damper bores in said cylinder block, damper plungers located in said damper bores, cams driven by said shaft for operating said damper plungers to vary the effective volume of said discharge chamber, and means provided by said drive shaft for driving said worm wheels.

11. A pump of the class described comprising a cylinder block having a central opening therethrough, four cylinder bores located in said block and parallel to said opening, two of said bores being of one size and the other two of said bores each being of half the cross section of one of the first-named bores, a piston in each end of each cylinder bore, a driving shaft extending through said opening and slidable lengthwise therein, a pair of transverse shafts at each end of said cylinder block, a worm wheel mounted on each of said transverse shafts, a pair of eccentrics driven by each worm wheel, a yoke associated with each eccentric and connected to one of said pistons, said eccentrics being arranged so that the two smaller cylinder bores discharge simultaneously to constitute in effect a single pumping chamber, a common discharge chamber communicating with all of the cylinder bores, means provided by said drive shaft for driving said worm wheels, said means including a set of inclined teeth meshing with two of said worm wheels and another set of teeth inclined oppositely to said first set and meshing with the other two of said worm wheels, pressure responsive means for shifting said drive shaft relative to said worm wheels to vary the discharge from said cylinder bores, and yielding means for resisting shifting movement of said drive shaft.

12. A pump of the class described comprising a cylinder block having a central opening therethrough, four cylinder bores located in said block and parallel to said opening, a piston in each end of each cylinder bore, a driving shaft extending through said opening and slidable lengthwise therein, a pair of transverse shafts at each end of said cylinder block, a worm wheel mounted on each of said transverse shafts, a pair of eccentrics driven by each worm wheel, a yoke associated with each eccentric and connected to one of said pistons, a common discharge chamber communicating with all of the cylinder bores, means provided by said drive shaft for driving said worm wheels, said means including a set of inclined teeth meshing with two of said worm wheels and another set of teeth inclined oppositely to said first set and meshing with the other two of said worm wheels, pressure responsive means for shifting said drive shaft relative to said worm wheels to vary the discharge from said cylinder bores, manually operable means for shifting said drive shaft, and yielding means for resisting shifting movement of said drive shaft.

13. A pump of the class described, comprising a cylinder block having a central opening therethrough, four cylinder bores located in said block and parallel to said opening, two of said bores being of one size and the other two of said bores each being of half the cross section of one of the first named bores, a piston in each end of each cylinder bore, a driving shaft extending through said opening and slidable lengthwise therein, a pair of transverse shafts at each end of said cylinder block, a worm wheel mounted on each of said transverse shafts, a pair of eccentrics driven by each worm wheel, a yoke associated with each eccentric and connected to one of said pistons, said eccentrics being arranged so that the two smaller cylinder bores discharge simultaneously to constitute in effect a single pumping chamber, a common discharge chamber communicating with all of the cylinder bores, radially extending damper bores in said cylinder block, damper plungers located in said damper bores, cams driven by said shaft for operating said damper plungers to vary the effective volume of said discharge chamber, means for shifting said cams relative to each other to vary the effectiveness of said damper plungers, means provided by said drive shaft for driving said worm wheels, said last named means including a set of inclined teeth meshing with two of said worm wheels and another set of teeth inclined oppositely to said first set and meshing with the other two of said worm wheels, pressure responsive means for shifting said drive shaft relative to said worm wheels to vary the discharge from said cylinder bores, and yielding means for resisting shifting movement of said drive shaft.

14. A pump of the class described, comprising a body having an opening extending through the center thereof, a group of three cylinder bores arranged in a plane perpendicular to said opening and forming an equilateral triangle, a second group of three cylinder bores arranged in an equilateral triangle and located in a plane parallel to said first named plane, means providing communication between the apices of the two triangles, pistons located in said cylinder bores, a shaft extending through said opening, a first gear having inclined teeth provided by said shaft, three driving gears operated by said inclined teeth, cranks driven by said driving gears, driving connections between said cranks and the pistons in the cylinder bores of one plane, a second gear having oppositely inclined teeth provided by said shaft, a second set of driving gears driven by said last-named inclined teeth, a second set of cranks driven by said last-named driving gears, driving connections between said last-named cranks and the other pistons, a single central guide for all of said driving connections, means for causing relative movement between the gears with inclined teeth and said driving gears, and a separate guide for each of said driving connections.

15. A pump of the class described, comprising a body having an opening extending through the center thereof, a group of cylinder bores arranged in a plane perpendicular to said opening, a second group of cylinder bores located in a plane parallel to said first named plane, means providing communication between certain cylinders of the two groups, pistons located in said cylinder bores, a shaft extending through said opening, a first gear having inclined teeth provided by said shaft, driving gears operated by said inclined teeth, cranks driven by said driving gears, connections between said cranks and the pistons in the cylinder bores of one plane, a second gear having oppositely inclined teeth provided by said shaft, a second set of driving gears driven by said last-named inclined teeth, a second set of cranks driven by said last-named driving gears, means connecting said last-named cranks with the pistons in the other plane, other gears meshing with said second set of driving gears to form a plurality of primary gear pumps, a conduit connecting each gear pump with one of said cylinders, conduit means interconnecting said gear pumps, means for causing simultaneous relative movement between said gears with inclined teeth and said driving gears and a common discharge outlet for all of said cylinder bores.

16. A pump of the class described, comprising a pumping chamber, a first means for varying the size of said chamber, a second means for varying the size of said chamber, a pair of gears for driving said two means, a longitudinally shiftable shaft for driving said gears, said shaft having a set of inclined teeth meshing with one of said gears and a second set of teeth inclined oppositely to said first set and meshing with the other of said gears, a motor for rotating said shaft, means interconnecting said shaft and said motor so that said shaft may be shifted longitudinally while being driven by said motor, means for shifting said shaft relative to said gears, to change the phase relationship between said first and second means to vary the discharge from said pumping chamber, and spring means acting on said shaft for resisting such movement.

GEORGE H. PALM.

REFERENCES CITED

The following references are of record in the file of this patent:

UNITED STATES PATENTS

| Number | Name | Date |
|---|---|---|
| 1,502,195 | Hicks | July 22, 1924 |
| 1,937,367 | Vickers | Nov. 28, 1933 |
| 1,983,229 | Hillier et al. | Dec. 4, 1934 |
| 2,048,272 | Linthicum | July 21, 1936 |
| 2,256,743 | Kleckner | Sept. 23, 1941 |
| 2,315,076 | Orshansky, Jr., et al. | Mar. 30, 1943 |
| 2,327,787 | Heintz | Aug. 24, 1943 |